(12) United States Patent
Westmacott et al.

(10) Patent No.: US 11,403,774 B2
(45) Date of Patent: Aug. 2, 2022

(54) IMAGE ANNOTATION

(71) Applicant: Five AI Limited, Bristol (GB)

(72) Inventors: Thomas Westmacott, Cambridge (GB); Brook Roberts, Cambridge (GB); John Redford, Cambridge (GB)

(73) Assignee: Five AI Limited, Bristol (GB)

( * ) Notice: Subject to any disclaimer, the term of this patent is extended or adjusted under 35 U.S.C. 154(b) by 0 days.

(21) Appl. No.: 16/980,356

(22) PCT Filed: Mar. 13, 2019

(86) PCT No.: PCT/EP2019/056356
§ 371 (c)(1),
(2) Date: Sep. 11, 2020

(87) PCT Pub. No.: WO2019/175286
PCT Pub. Date: Sep. 19, 2019

(65) Prior Publication Data
US 2021/0049780 A1  Feb. 18, 2021

(30) Foreign Application Priority Data
Mar. 14, 2018 (GB) ...................... 1804082

(51) Int. Cl.
*G06T 7/33* (2017.01)
*G06T 7/50* (2017.01)
(Continued)

(52) U.S. Cl.
CPC .......... *G06T 7/344* (2017.01); *B60W 60/001* (2020.02); *G01C 21/3819* (2020.08);
(Continued)

(58) Field of Classification Search
CPC .......... G06T 7/344; G06T 2207/10004; G06K 9/00798
See application file for complete search history.

(56) References Cited

U.S. PATENT DOCUMENTS

2015/0086080 A1  3/2015 Stein et al.
2017/0243083 A1* 8/2017 Wang ................... G06K 9/6262
(Continued)

FOREIGN PATENT DOCUMENTS

WO   WO 2011/049294 A2   4/2011

OTHER PUBLICATIONS

Barnes Dan et al.: "Find your own way: Weakly-supervised segmentation of path proposals for urban autonomy", 2017 IEEE International Conference on Robotics and Automation (ICRA), IEEE, May 29, 2017 (May 29, 2017), pp. 203-210 (Year: 2017).*
(Continued)

*Primary Examiner* — Myron Wyche
(74) *Attorney, Agent, or Firm* — Andrew J. Tibbetts; Greenberg Traurig, LLP

(57) ABSTRACT

A method of annotating road images, the method comprising implementing, at an image processing system, the following steps: receiving a time sequence of two dimensional images as captured by an image capture device of travelling vehicle; processing the images to reconstruct, in three-dimensional space, a path travelled by the vehicle; using the reconstructed vehicle path to determine expected road structure extending along the reconstructed vehicle path; and generating road annotation data for marking at least one of the images with an expected road structure location, by performing a geometric projection of the expected road structure in three-dimensional space onto a two-dimensional plane of that image.

20 Claims, 25 Drawing Sheets

(51) Int. Cl.
*B60W 60/00* (2020.01)
*G01C 21/00* (2006.01)
*G06V 20/56* (2022.01)

(52) U.S. Cl.
CPC .......... *G01C 21/3822* (2020.08); *G06T 7/50* (2017.01); *G06V 20/588* (2022.01); *B60W 2420/42* (2013.01); *B60W 2552/20* (2020.02); *G06T 2207/10004* (2013.01); *G06T 2207/10028* (2013.01); *G06T 2207/30256* (2013.01)

(56) References Cited

U.S. PATENT DOCUMENTS

2019/0114921 A1* 4/2019 Cazzoli .................. H04W 4/40
2021/0342600 A1 11/2021 Westmacott et al.

OTHER PUBLICATIONS

International Search Report and Written Opinion for International Application No. PCT/EP2019/056356, dated Jul. 23, 2019.
Barnes et al., Find your own way: Weakly-supervised segmentation of path proposals for urban autonomy. 2017 IEEE International Conference on Robotics and Automation (ICRA). May 29, 2017:203-10).
Tang et al., From one to many: Unsupervised traversable area segmentation in off-road environment. 2017 IEEE International Conference on Robotics and Biomimetics (ROBIO). Dec. 5, 2017:787-92.
Zhang et al., Annotating and navigating tourist videos. Proceedings of the 18th SIGSPATIAL International Conference on Advances in Geographic Information Systems. Nov. 2, 2010:260-69.
PCT/EP2019/056356, dated Jul. 23, 2019, International Search Report and Written Opinion.
[No Author Listed], mapillary / OpenSfM. Github. Aug. 11, 2020:3 pages. https://github.com/mapillary/OpenSfM [last accessed Jan. 29, 2021].
[No Author Listed], TuSimple / tusimple-benchmark. Github. Jul. 17, 2017:5 pages. https://github.com/TuSimple/tusimple-benchmark/tree/master/doc/lane detection [last accessed Jan. 29, 2021].
Aly, Real time detection of lane markers in urban streets. 2008 IEEE Intelligent Vehicles Symposium Jun. 4, 2008:7-12.
Badrinarayanan et al., Segnet: A deep convolutional encoder-decoder architecture for image segmentation. IEEE transactions on pattern analysis and machine intelligence. Jan. 2, 2017;39(12):2481-95.
Borkar et al., A novel lane detection system with efficient ground truth generation. IEEE Transactions on Intelligent Transportation Systems. Dec. 8, 2011;13(1):365-74.
Brostow et al., Segmentation and recognition using structure from motion point clouds. European conference on computer vision. Oct. 12, 2008:44-57.
Brostow et al., Semantic object classes in video: A high-definition ground truth database. Pattern Recognition Letters. Jan. 15, 2009;30(2):88-97.
Cordts et al., The cityscapes dataset for semantic urban scene understanding. Proceedings of the IEEE conference on computer vision and pattern recognition. 2016:3213-3223.
Fritsch et al., A new performance measure and evaluation benchmark for road detection algorithms. 16th International IEEE Conference on Intelligent Transportation Systems (ITSC 2013). Oct. 6, 2013:1693-1700.
Gaidon et al., Virtual worlds as proxy for multi-object tracking analysis. Proceedings of the IEEE conference on computer vision and pattern recognition. 2016:4340-4349.
Gopalan et al., A learning approach towards detection and tracking of lane markings. IEEE Transactions on Intelligent Transportation Systems. Feb. 17, 2012; 13(3):1088-98.
Hillel et al., Recent progress in road and lane detection: a survey. Machine vision and applications. Apr. 2014;25(3):727-45.
Huval et al., An empirical evaluation of deep learning on highway driving. ArXiv preprint arXiv:1504.01716v3. Apr. 17, 2015;3:1-7.
Kim, Robust lane detection and tracking in challenging scenarios. IEEE Transactions on Intelligent Transportation Systems. Feb. 26, 2008;9(1):16-26.
Laddha et al., Map-supervised road detection. 2016 IEEE Intelligent Vehicles Symposium (IV). Jun. 19, 2016:118-123.
Leibe et al., Dynamic 3d scene analysis from a moving vehicle. 2007 IEEE Conference on Computer Vision and Pattern Recognition. Jun. 17, 2007:1-8.
Li et al., Deep neural network for structural prediction and lane detection in traffic scene. IEEE transactions on neural networks and learning systems. Feb. 16, 2016;28(3):690-703.
Mathibela et al., Reading the road: Road marking classification and interpretation. IEEE Transactions on Intelligent Transportation Systems. Mar. 5, 2015;16(4):2072-81.
McCall et al., Video-based lane estimation and tracking for driver assistance: survey, system, and evaluation. IEEE transactions on intelligent transportation systems. Mar. 6, 2006;7(1):20-37.
Neuhold et al., The mapillary vistas dataset for semantic understanding of street scenes. Proceedings of the IEEE International Conference on Computer Vision. 2017:4990-4999.
Neven et al., Towards end-to-end lane detection: an instance segmentation approach. ArXiv preprint arXiv: 1802.05591v1. Feb. 15, 2018:1-7.
Oliveira et al., Efficient deep models for monocular road segmentation. 2016 IEEE/RSJ International Conference on Intelligent Robots and Systems (IROS). Oct. 2016:4885-4891.
Richter et al., Playing for data: Ground truth from computer games. ArXiv preprint arXiv: 1608.02192v1. Aug. 7, 2016;1:1-16.
Ros et al., The synthia dataset: A large collection of synthetic images for semantic segmentation of urban scenes. Proceedings of the IEEE conference on computer vision and pattern recognition. 2016:3234-3243.
Scharwächter et al., Efficient multi-cue scene segmentation. German Conference on Pattern Recognition Sep. 3, 2013:435-445.
Sengupta et al., Automatic dense visual semantic mapping from street-level imagery. 2012 IEEE/RSJ International Conference on Intelligent Robots and Systems. Oct. 7, 2012:857-862.
Xie et al., Semantic instance annotation of street scenes by 3d to 2d label transfer. Proceedings of the IEEE Conference on Computer Vision and Pattern Recognition. 2016:3688-3697.
International Search Report and Written Opinion for International Application No. PCT/EP2019/076091 dated Jan. 15, 2020.
Roberts et al., A Dataset for Lane Instance Segmentation in Urban Environments. ArXiv preprint arXiv: 1807.01347v2. Aug. 2, 2018;2:1-17.

* cited by examiner

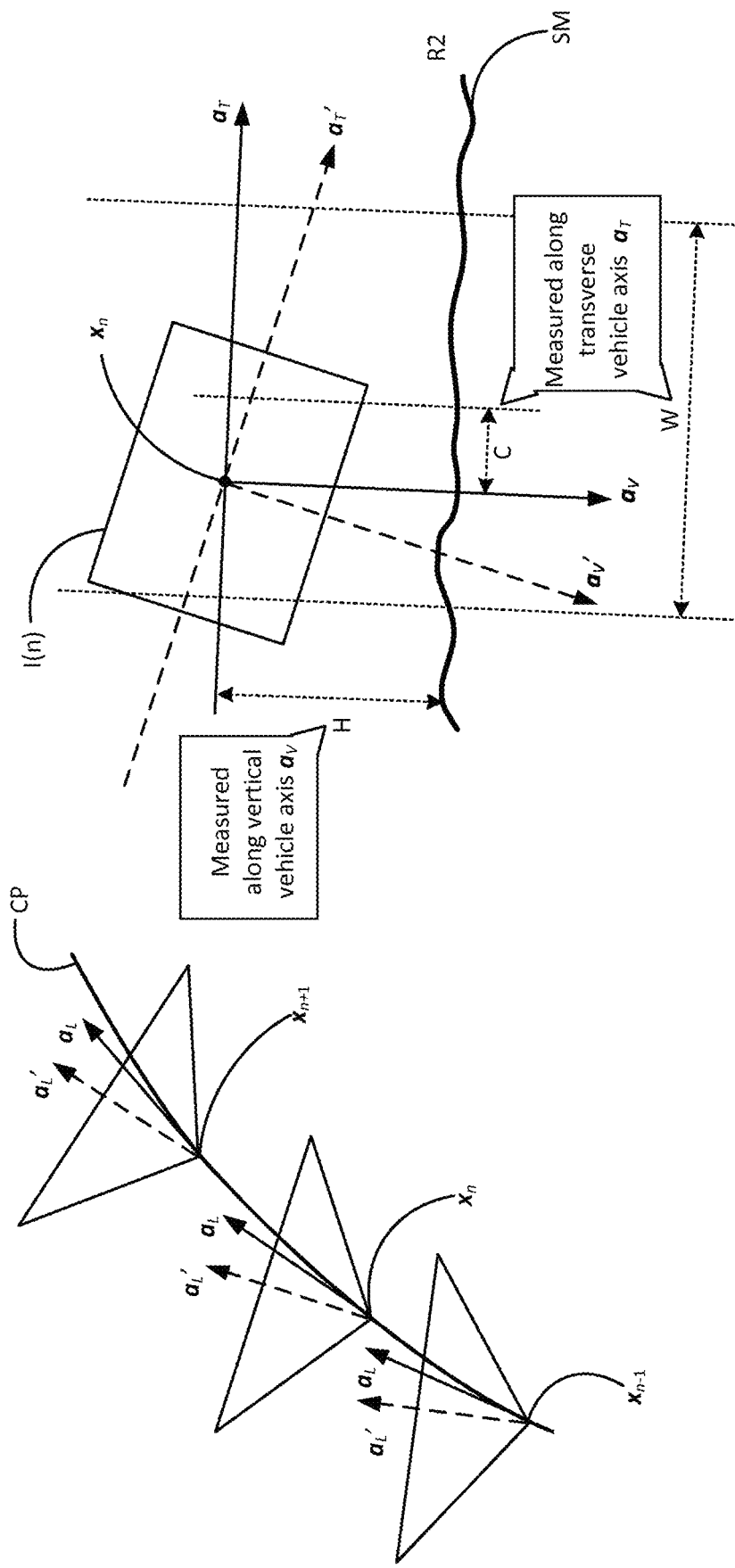

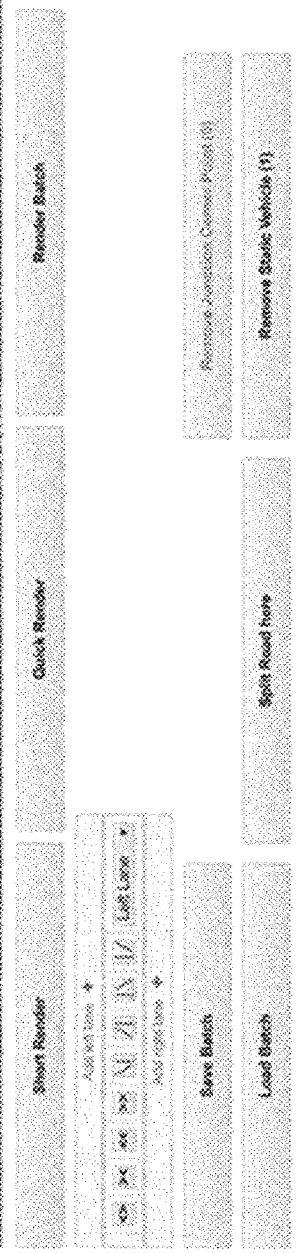
Fig. 21

IMAGE ANNOTATION

RELATED APPLICATIONS

This application is a national stage filing under 35 U.S.C. § 371 of international application number PCT/EP2019/056356, filed Mar. 13, 2019, which claims the benefit of British application number 1804082.4, filed Mar. 14, 2018.

TECHNICAL FIELD

This disclosure relates to image annotation, such as the creation of annotated street road images which can be used (among other things) for training a machine learning road detection component. This disclosure also relates to related systems and methods which can be used in this context, but which also have applications in other contexts.

BACKGROUND

A rapidly emerging technology is autonomous vehicles (AVs) that can navigate by themselves on urban and other roads. Such vehicles must not only perform complex manoeuvres among people and other vehicles, but they must often do so while guaranteeing stringent constraints on the probability of adverse events occurring, such as collision with these other agents in the environments. In order for an AV to plan safely, it is crucial that it is able to observe its environment accurately and reliably. This includes the need for accurate and reliable detection of road structure in the vicinity of the vehicle.

Hence, in the field of autonomous driving a common requirement is to have a structure detection component (also referred to as a machine vision component) that when given a visual input can determine real-world structure, such as road or lane structure, e.g. which part of the image is road surface, which part of the image makes up lanes on the road, etc.

This is frequently implemented with machine learning using convolutional neural networks. Such networks require large numbers of training images. These training images are like the images that will be seen from cameras in the autonomous vehicle, but they have been annotated with the information that the neural network is required to learn. For example, they will have annotation that marks which pixels on the image are the road surface and/or which pixels of the image belong to lanes. At training time, the network is presented with thousands, or preferably hundreds of thousands, of such annotated images and learns itself what features of the image indicate that a pixel is road surface or part of a lane. At run time, the network can then make this determination on its own with images it has never seen before, i.e. which it has not encountered during training.

The conventional technique for creating the annotated training images is to have humans manually hand annotate the images. This can take tens of minutes per image (and thus incur very significant time significant costs to obtain the large number of images that are required). Creating hundreds of thousands of training images using this manual process requires significant manual effort, which in turn makes it a costly exercise. In practice, it imposes a limit on the number of training images that can realistically be provided, which in turn can be detrimental to the performance of the trained structure detection component.

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

SUMMARY

A core problem addressed herein is that of quickly and efficiently but, nonetheless, accurately annotating road images, where the annotations denote visual road structure. Such images can for example be used to prepare a very large training set of annotated road images suitable for training a convolutional neural network (CNN) or other state-of-the-art machine learning (ML) structure detection component.

This problem is solved through the use of novel automatic or semi-automatic image annotation technology, aspects and embodiments of which are set out below. The technology allows large numbers of training images to be generated more efficiently and quickly than such manual annotation, by removing or at least significantly reducing the need for human effort.

The performance of such trained structure detection components has a strong dependence on both the quality and the size of the training set. The ability to generate large training sets of accurately annotated road images, of a size which simply may not be practical using conventional annotation, in turn means that it is possible to increase the accuracy of the trained structure detection component when applied (at run time) to images it has not encountered in training.

A first aspect of the invention provides a method of annotating road images, the method comprising implementing, at an image processing system, the following steps: receiving a time sequence of two dimensional images as captured by an image capture device of travelling vehicle; processing the images to reconstruct, in three-dimensional space, a path travelled by the vehicle; using the reconstructed vehicle path to determine expected road structure extending along the reconstructed vehicle path; and generating road annotation data for marking at least one of the images with an expected road structure location, by performing a geometric projection of the expected road structure in three-dimensional space onto a two-dimensional plane of that image.

Preferably the expected road structure is determined using only information derived from image data captured by the image capture device (that is, the vehicle path as derived from the image data of the captured images, and optionally one or more reference parameters derived from image data captured by the image capture device), without the use of any other vehicle sensor and without any requiring any calibration of the image capture device. For example, one or more parameters of the image capture device (image capture device) and/or one or more parameters of the expected road structure may be derived from (only) the image data captured by the image capture device. The can be derived from the image data using one or more of the techniques set out below. This provides a low-cost solution in which the only equipment that is required to collect the images is a standard vehicle and a basic camera, such as a dash-cam.

In embodiments, the step of using the reconstructed vehicle path to determine the expected road structure comprises determining an expected road structure boundary, defined as a curve in three-dimensional space running parallel to the reconstructed vehicle path, wherein the road annotation data is for marking the location of the expected road structure boundary in the image.

The expected road structure location in that image may be determined from the path travelled by the vehicle after that image was captured.

The expected road structure location in that image may be determined from the path travelled by the vehicle before that image was captured.

The annotated road images may be for use in training an automatic road detection component for an autonomous vehicle.

The expected road structure may be determined based on at least one of: a road or lane width, and an offset of the vehicle from a road or lane boundary.

A constant road or lane width or offset may be applied across at least part of the time series of images.

The road or lane width may be determined based on one or more manual width adjustment inputs. These may be received in accordance with the fourth aspect of this disclosure as set out below.

The manual width adjustment inputs may be received in respect of one image, and used to modify the expected road structure and project the modified road structure into one or more other of the images.

The expected road structure may be determined based on a road normal vector.

The road normal vector n may be estimated from the images as:

$$n = \frac{1}{\sum_{i=2}^{N-2} \|n_i\|} \sum_{i=2}^{N-2} n_i$$

$$n_i = R_i^{-1}(m_{i-1,i} \otimes m_{i,i+1}),$$

The expected road structure may be determined based on a forward direction vector.

The forward direction vector may be estimated from the images as:

$$f = \frac{1}{\sum_i a_i} \sum_{i=2}^{N-2} a_i f_i$$

$$a_i = \max(m_{i-1,i}^T m_{i,i+1}, 0)$$

$$f_i = R_i^{-1} m_{i-1,i+1}.$$

f and n may be used to determined border points of the expected road structure.

The border points may be determined as:

$$b_i^{left} = g_i + w_i^{left} R_i r$$

$$b_i^{right} = g_i + w_i^{right} R_i r$$

$$r = f \otimes n.$$

Ri being a camera pose determined for image i in reconstructing the vehicle path, and $g_i$ being a road point below the image capture device.

The road point below the camera may be computed as $$g_i = c_i + h R_i n$$

wherein h is a height of the camera and $c_i$ is a 3D position of the image capture device determined in reconstructing the vehicle path.

The vehicle path may be reconstructed using simultaneous localization and mapping (SLAM) processing.

A camera pose $R_i$ may be determined for each image i in performing the SLAM processing.

A 3D camera location $c_i$ may be determined for each image i in performing the SLAM processing.

The expected road structure may be determined based on a relative angular orientation of the image capture device, as measured from the images in accordance with the fourth aspect set out below or any embodiment thereof.

The expected road structure may be determined based on a relative rotational orientation of the image capture device, as measured from the images in accordance with the third aspect set out below or any embodiment thereof.

The projection may be performed based on a height of the image capture device in the vehicle.

The height may be estimated based on an average height of a reconstructed path of the image capture device and a 3D road structure mesh computed from the images.

Furthermore, it has also been recognized that the image-based measurement techniques set out above can also be useful applied in other contexts, outside of the core problem set out above. Hence, these constitute separate aspects of this discloser which may be applied and implemented independently.

A second aspect of the invention provides a method of measuring a relative angular orientation of an image capture device within a vehicle, the method comprising implementing, at an image processing system, the following steps: receiving a time sequence of two dimensional images as captured by the image capture device of the vehicle; processing the images to reconstruct, in three-dimensional space, a path travelled by the vehicle, and to estimate an absolute angular orientation of the image capture device, for at least one reference point on the reconstructed path; determining a forward direction vector defined as a vector separation between a point before the reference point on the reconstructed path and a point after the reference point on the reconstructed path; using the forward direction vector and the absolute angular orientation of the image capture device determined for the reference point to determine an estimated angular orientation of the image capture device relative to the vehicle.

In embodiments, an absolute angular orientation may be determined for the image capture device for multiple reference points on the reconstructed path in the processing step and the determining and using steps are performed for each of the reference points to determine an estimated angular orientation of the image capture device relative to the vehicle for each of the reference points, and wherein the method further comprises a step of determining an average of the relative image capture device angular orientations.

The average may be a weighted average.

Each of the relative image capture device angular orientations may be weighted in dependence on a change in direction exhibited in the path between the earlier reference point and later reference point.

The method may further comprise steps of: determining a first separation vector between the reference point and the point before the reference point on the reconstructed path;

and determining a second separation vector between the reference point and the point after the reference point on the reconstructed path; wherein each of the relative image capture device angular orientations is weighted according to a vector dot product of the first and second separation vectors.

The estimated angular orientation of the image capture device relative to the vehicle may be in the form of an estimated longitudinal axis of the vehicle in a frame of reference of the image capture device.

The reference point or each reference point may be equidistant from the point before it and the point after it.

The estimated angular orientation of the image capture device relative to the vehicle may be used, together with an estimate of an angular orientation of the image capture device at another point on the path, to determine an estimate of an absolute angular orientation of the vehicle at the other point on the path.

A three dimensional surface map may be created in processing the captured images, wherein the absolute angular orientation of the vehicle at the other point on the path is used to determine a distance, along an axis of the vehicle at that point, between two points on the three dimensional surface map.

A three dimensional surface map may be created in processing the captured images, wherein the absolute angular orientation of the vehicle at the other point on the path may be used to determine a distance, along an axis of the vehicle at that point, between the image capture device and a point on the three dimensional surface map.

A third aspect of the invention provides a method of measuring a relative rotational orientation of an image capture device within a vehicle, the method comprising implementing, at an image processing system, the following steps: receiving a time sequence of two dimensional images as captured by the image capture device of the vehicle; processing the images to reconstruct, in three-dimensional space, a path travelled by the vehicle, and to estimate an absolute rotational orientation of the image capture device for at least one reference point on the reconstructed path; determining a first separation vector between the reference point and a point before the reference point on the reconstructed path; determining a second separation vector between the reference point and a point after the reference point on the reconstructed path; using the first and second separation vectors and the absolute rotational orientation of the image capture device determined for the reference point to determine an estimated rotational orientation of the image capture device relative to the vehicle.

In embodiments the method may comprise a step of determining a normal vector for the reference point, perpendicular to the first and second separation vectors, wherein the normal vector and the absolute rotational orientation are used to determine the estimated rotational orientation of the image capture device relative to the vehicle.

The normal vector may be determined by computing a vector cross product of the first and second separation vectors.

An absolute rotational orientation may be determined for the image capture device for multiple reference points on the reconstructed path in the processing step and the determining and using steps may be performed for each of the reference points to determine an estimated rotational orientation of the image capture device relative to the vehicle for each of the reference points, and wherein the method may further comprise a step of determining an average of the relative image capture device rotational orientations.

The average may be a weighted average.

The relative image capture device rotational orientation for each of the reference points may be weighted in dependence on an offset angle between the first and second separation vectors at that reference point.

The relative image capture device rotational orientation may be weighted in dependence on the magnitude of the vector cross product.

The relative image capture device rotational orientation for each of the reference points may be weighted in dependence on a change of curvature of the path between the point before the reference point and the point after it.

The estimated rotational orientation of the image capture device relative to the vehicle may be in the form of an estimated vertical axis of the vehicle in a frame of reference of the image capture device.

The estimated rotational orientation of the image capture device relative to the vehicle may be used, together with an estimate of a rotational orientation of the image capture device at another point on the path, to determine an estimate of an absolute rotational orientation of the vehicle at the other point on the path.

A three dimensional surface map may be created in processing the captured images, wherein the absolute rotational orientation of the vehicle at the other point on the path may be used to determine a distance, along an axis of the vehicle at that point, between two points on the three dimensional surface map.

A three dimensional surface map may be created in processing the captured images, wherein the absolute rotational orientation of the vehicle at the other point on the path may be used to determine a distance, along an axis of the vehicle at that point, between the image capture device and a point on the three dimensional surface map.

In the first aspect of the invention set out above, a 3D road model is created based on a reconstructed vehicle path, which in turn can be projected into the image plane of images to automatically generate 2D annotation data. As set out above, embodiments of this aspect provide for fast manual "tweaks" (which can be applied efficiently across multiple images). It is furthermore recognized that this same technique can be implemented in an image annotation tool with 3D road models obtained by other means, to obtain the same benefits of fast, manual modifications across multiple images simultaneously.

In another aspect, a method of determining an estimated orientation of an image capture device relative to a vehicle comprises: performing the steps of the second aspect or any embodiment thereof to estimate the angular orientation of the image capture device within the vehicle; and performing the steps of the third aspect or any embodiments estimate the rotational orientation of the image capture device within the vehicle; wherein the estimated orientation of the image capture device relative to the vehicle comprises the estimated rotational and angular orientations.

The estimated orientation of the image capture device relative to the vehicle may be used, together with an estimate of an absolute orientation of the image capture device at another point on the path, to determine a distance, along an axis of the vehicle at that point, between two points on the three dimensional surface map, or between the image capture device and a point on the three dimensional surface map.

A fourth aspect of the invention provides an image annotation system comprising: an input configured to receive a sequence of two-dimensional images captured by an image capture device of vehicle; a modelling component configured to generate a three-dimensional structure model of an environment travelled by the vehicle whilst capturing the images; a path determination component configured to determine, for each of the captured images, a corresponding location and orientation of the image capture device within the environment when that image was captured; an annotation component configured to generate two-dimensional image annotation data for marking regions of the images corresponding to the three-dimensional structure model, by geometrically projecting the three-dimensional structure model onto an image plane of each image that is defined by the corresponding image capture device location and orientation; a rendering component configured to render at least one of the images and its two-dimensional image annotation data via a user interface; and a model adaptation component configured to adapt the three-dimensional structure model according to instructions received via the user interface, wherein the annotation component is configured to modify the two-dimensional image annotation data for each of the captured images based on the adapted three-dimensional structure model, and the rendering component is configured to render the modified annotation data for the at least one image via the user interface, thereby allowing a user to effect modifications of the two-dimensional image annotation data for multiple captured images simultaneously, using the at least one image and its two-dimensional image annotation data as a reference.

In embodiments, the three-dimensional structure model may comprise expected road structure as determined in accordance with the first aspect or any claim dependent thereon.

The path determination component may be configured to determine the image capture locations and orientations by processing the sequence of captured images.

The modelling component may be configured to determine an expected structure of the three-dimensional structure model based on a path through the environment that is defined by the determined image capture device locations.

The expected structure may run parallel to the path defined by the image capture device locations.

The modelling component may be configured to assign a label to at least one structure of the three-dimensional structure model, and the annotation component may be configured to associate the label with corresponding regions marked in the images.

The modelling component may be configured to assign a parallel structure label to the expected parallel structure.

The modelling component may be configured to assign one of the following labels to the expected parallel structure: a road label, a lane label, a non-drivable label, an ego lane label, a non-ego lane label, a cycle or bus lane label, a parallel road marking or boundary label.

The expected road structure may extend perpendicular to the path defined by the image capture locations.

The modelling component may be configured to assign a perpendicular structure label to the expected perpendicular structure.

The modelling component may be configured to assign a junction label, a perpendicular road marking or boundary label, a give-way line label to the expected perpendicular structure.

The three-dimensional structure model may have at least one structure created by a user via the user interface.

The three-dimensional structure model may have at least one structure corresponding to stationary object.

The structure corresponding to the stationary object may be user-created.

The modelling component may be configured to generate the three-dimensional structure model using one or more of the following reference parameters: a location of the image capture device relative to the vehicle, a orientation of the image capture device relative to the vehicle, a distance between two real-world elements as measured along an axis of the vehicle.

The image annotation system may comprise a parameter computation component configured to estimate the one or more reference parameters by processing image data captured by the image capture device of the vehicle.

The image data may comprise image data of the captured sequence of images.

The model adaptation component may be configured create, in response to a parallel structure creation instruction received via the user interface, a new structure of the three dimensional structure model that is orientated parallel to at least one of: a path defined by the image capture device locations, and an existing structure of the three dimensional structure model, wherein the orientation of the new structure is determined automatically by the model adaptation component based on the orientation of the path or the existing structure.

The model adaptation component may be configured to adapt, in response to a parallel structure adaptation instruction received via the user interface, an existing parallel structure of the three dimensional structure model.

The model adaptation component may be configured to change the width of the existing parallel structure, or change the location of the existing parallel structure.

The model adaptation component may be configured to change the width of a second portion of the existing structure whilst keeping the width of a first portion of the parallel structure fixed.

The model adaptation component may be configured to interpolate an intermediate of the adapted structure between the first and second portions.

A fifth aspect of the invention provides localization system for an autonomous vehicle, the localization system comprising: an image input configured to receive captured images from an image capture device of an autonomous vehicle; a road map input configured to receive a predetermined road map; a road detection component configured to process the captured images to identify road structure therein; and a localization component configured to determine a location of the autonomous vehicle on the road map, by matching the road structure identified in the images with corresponding road structure of the predetermined road map.

A vehicle control system is provided which comprises the localization system and a vehicle control component configured to control the operation of the autonomous vehicle based on the determined vehicle location.

A sixth aspect of the invention provides a road structure detection system for an autonomous vehicle, the road structure detection system comprising: an image input configured to receive captured images from an image capture device of an autonomous vehicle; a road map input configured to receive predetermined road map data; and a road detection component configured to process the captured images to identify road structure therein; wherein the road detection component is configured to merge the predetermined road map data with the road structure identified in the images.

A vehicle control system is provided comprising the road structure detection is and a vehicle control component configured to control the operation of the autonomous vehicle based on the merged data.

A seventh aspect of the invention provides a control system for an autonomous vehicle, the control system comprising: an image input configured to receive captured images from an image capture device of an autonomous vehicle; a road map input configured to receive a predetermined road map; a road detection component configured to process the captured images to identify road structure therein; and a map processing component configured to select a corresponding road structure on the road map; and a vehicle control component configured to control the operation of the autonomous vehicle based on the road structure identified in the captured images and the corresponding road structure selected on the predetermined road map.

In embodiments of the seventh aspect, the control system may comprise a localization component configured to determine a current location of the vehicle on the road map. The road detection component may be configured to determine a location of the identified road structure relative to the vehicle. The map processing component may select the corresponding road structure based on the current location of the vehicle, for example by selecting an area of the road map containing the corresponding road structure based on the current vehicle location (e.g. corresponding to an expected field of view of the image capture device), e.g. in order to merge that area of the map with the identified road structure. Alternatively, the map processing component may select the corresponding vehicle structure by comparing the road structure identified in the images with the road map to match the identified road structure to the corresponding road structure, for example to allow the localization component to determine the current vehicle location based thereon, e.g. based on the location of the identified road structure relative to the vehicle.

Various embodiment of the invention are defined in the dependent claims. Features described or claimed in relation to any one of the above aspects of the invention may be implemented in embodiments of any of the other aspects of the invention.

A computer program product is provided comprising code stored on a computer-readable storage medium and configured, when executed on one or more processors, to implement the method or system of any preceding claim.

BRIEF DESCRIPTION OF FIGURES

For a better understanding of the present invention, and to show how embodiments of the same may be carried into effect, reference is made to the following Figures by way of non-limiting example in which:

FIG. 10 illustrates certain principles of image-based measurement of an angular orientation of an image capture device;

FIG. 11 illustrates certain principles of image-based measurement of road width;

FIGS. 18 to 24 shows examples of an annotation tool user interface for annotating images based on the techniques disclosed herein;

DETAILED DESCRIPTION

Figure 1:
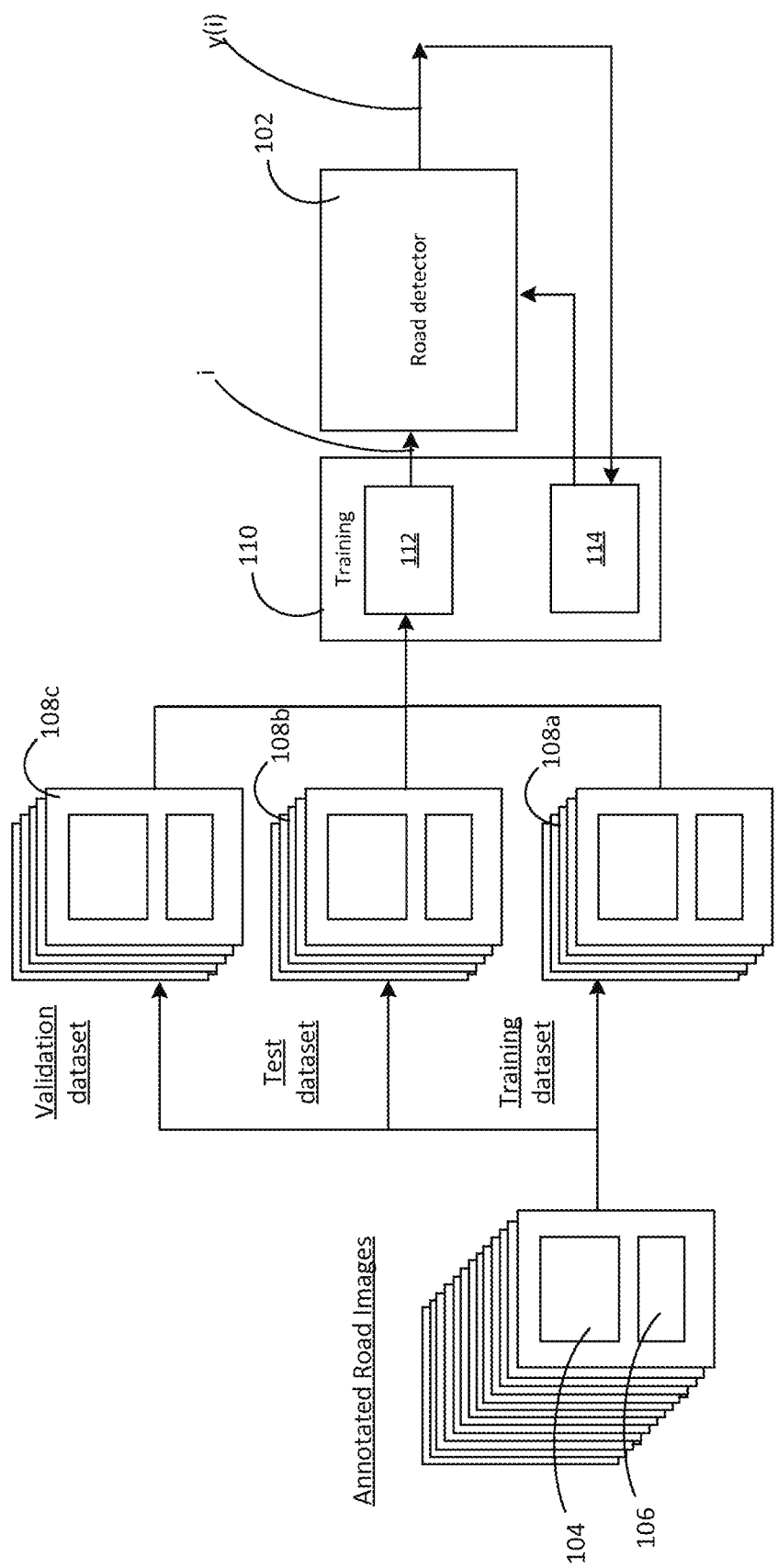
FIG. 1 shows a highly schematic function block diagram of a training system for training a structure detection component.

Autonomous vehicles require knowledge of the surrounding road layout, which can be predicted by state-of-the-art CNNs. This work addresses the current lack of data for determining lane instances, which are needed for various driving manoeuvres. The main issue is the time-consuming manual labelling process, typically applied per image.

This disclosure recognizes that driving the car is itself a form of annotation. This is leveraged in a semi-automated method that allows for efficient labelling of image sequences by utilising an estimated road plane in 3D and projecting labels from this plane into all images of the sequence. The average labelling time per image is reduced to 5 seconds and only an inexpensive dash-cam is required for data capture.

Autonomous vehicles have the potential to revolutionise urban transport. Mobility will be safer, always available, more reliable and provided at a lower cost.

One important problem is giving the autonomous system knowledge about surrounding space: a self-driving car needs to know the road layout around it in order to make informed driving decisions. This disclosure addresses the problem of detecting driving lane instances from a camera mounted on a vehicle. Separate, space-confined lane instance regions are needed to perform various challenging driving manoeuvres, including lane changing, overtaking and junction crossing.

Typical state-of-the-art CNN models need large amounts of labelled data to detect lane instances reliably. However, few labelled datasets are publicly available, mainly due to the time-consuming annotation process; it takes from several minutes up to more than one hour per image to annotate images completely for semantic segmentation tasks. By contrast, the semi-automated annotation process herein reduces the average time per image to the order of seconds. This speed-up is achieved by (1) noticing that driving the car is itself a form of annotation and that cars mostly travel along lanes, (2) propagating manual label adjustments from a single view to all images of the sequence and (3) accepting non-labelled parts in ambiguous situations.

Some previous work has aimed on creating semi-automated object detections in autonomous driving scenarios. [27] propose to detect and project the future driven path in images, but does not address the problem of lane annotations. This means the path is not adapted to lane widths and crosses over lanes and junctions. Moreover, it requires an expensive sensor suite, which includes calibrated cameras and Lidar. In contrast, the present method is applicable to data from a GPS enabled dash-cam. Contributions of this disclosure include:

- A semi-automated annotation method for lane instances in 3D, requiring only inexpensive dash-cam equipment
- Road surface annotations in dense traffic scenarios despite occlusion
- Experimental results for road, ego-lane and lane instance segmentation using a CNN A method is described below that provides a fully automatic method of generating training data with only marginally lower quality than the conventional manual process.

An extension to this is also described, which introduces a manual correction ("human fixer") stage. With this extension, the method becomes a semi-automatic method that generates as good quality as the conventional manual method but with order 100 times less human effort, as measured in terms of annotation time per image. This is on the basis of the observation that a typical annotation time—using full manual annotation of the kind currently used at present—can be anything from 7 minutes to 90 minutes per image; whereas, using the method described below, it is possible to achieve an annotation time of around 12 seconds per image.

In the methods described below, the training images are frames of a video image. As will become apparent, the described methods are particularly well suited to batch-annotation of video frames as captured by a moving training vehicle. For a typical training video (formed of a sequence of static 2D images, i.e. frames), it has been possible to achieve an annotation time of 7 minutes per typical training video sequence, which amounts to about 12 seconds per image, whilst still achieving results of good quality.

FIG. 1 shows a highly schematic function block diagram of a training system for training a structure detection component 102 (road detector) based on annotated street scene images (also referred to as road images herein). That is, street scene images having associated image annotation data. In FIG. 1, a street scene image is labelled 104 and its corresponding image annotation data is labelled 106. The annotation data 106 marks the location(s) of certain structure within the image 104, such as roads, lanes, junctions, non-drivable areas etc. and possibly objects within the images, such as other vehicles, pedestrians, street signage or other infrastructure etc.

The images may be divided into training, test and validation datasets, labelled 108a, 108b and 108c respectively.

The detection component 102 takes as an input image data of a street scene image, labelled i, and generates an output y(i) where y is a function defined by a set of model parameters of the detection component 102. This can be in the form of a feature vector derived from the image, which can be formed of raw or transformed pixel values for example.

The detection component 102 is trained based on the training images 108a so as to match its output y(i) to the corresponding annotation data. This is a recursive process, in which an input component 112 of a training system 110 systematically inputs image data i of the training images 108b to the road detector 102, and a training component 114 of the training system 110 adapts the model parameters in an attempt to minimize an objective function that provides a measure of difference between the output y(i) and the corresponding annotation data 106 for each of the training images.

The detection component 102 can for example be a convolutional neural network, where the model parameters are weightings between neurons.

The test data 108b is used to minimize over-fitting, which refers to the fact that, beyond a certain point, increasing the accuracy of the detection component 102 on the training dataset 108a is detrimental to its ability to generalize to images it has not encountered during training. Overfitting can be identified as the point at which increasing the accuracy of the detection component 102 on the training data 108 reduces (or does not increase) its accuracy on the test data, with accuracy being measured in terms of the objective function. The aim of training is to minimize the objective function to the extent it can be minimized without overfitting.

The validation dataset 108c can be used to provide a final assessment of the detection component's performance, if desired.

Such machine learning techniques are known per se, and are therefore not described in further detail herein.

The method described below can be used to automatically or semi-automatically generate such annotation data 106, for use in training, testing and/or validation of the detection component 102.

Figure 2:
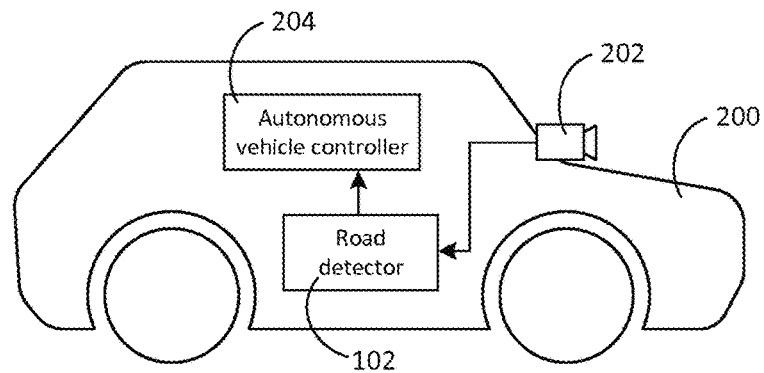
FIG. 2 shows a highly schematic block diagram of an autonomous vehicle.

FIG. 2 shows a highly-schematic block diagram of an autonomous vehicle 200, which is shown to comprise an instance of the trained detection component 102 having an input connected to an image capture device 202 of the vehicle 200 and an output connected to an autonomous vehicle controller 204. In use, the trained structure detection component 102 of the autonomous vehicle 200 detects structure within images captured by the image capture device 102, in real time, in accordance with its training, and the autonomous vehicle controller 204 controls the speed and direction of the vehicle based on the results, with no or limited input from any human.

Although only one image capture device 202 is shown in FIG. 2, the autonomous vehicle could comprise multiple such devices. For example, a pair of image capture devices could be arranged to provide a stereoscopic view, and the road structure detection methods can be applied to the images captured from each of the image capture devices.

As will be appreciated, this is a highly simplified description of certain autonomous vehicle functions. The general principles of autonomous vehicles are known, therefore are not described in further detail.

2 Video Collection

For the purpose of experiments detailed later, videos and associated GPS data were captured with a standard Nextbase 402G Professional dashcam recording at a resolution of 1920×1080 at 30 frames per second and compressed with the H.264 standard (however, any suitable low-cost image capture device could also be used to achieve the same benefits). The camera was mounted on the inside of the car windscreen, roughly along the centre line of the vehicle and approximately aligned with the axis of motion.

Figure 26:
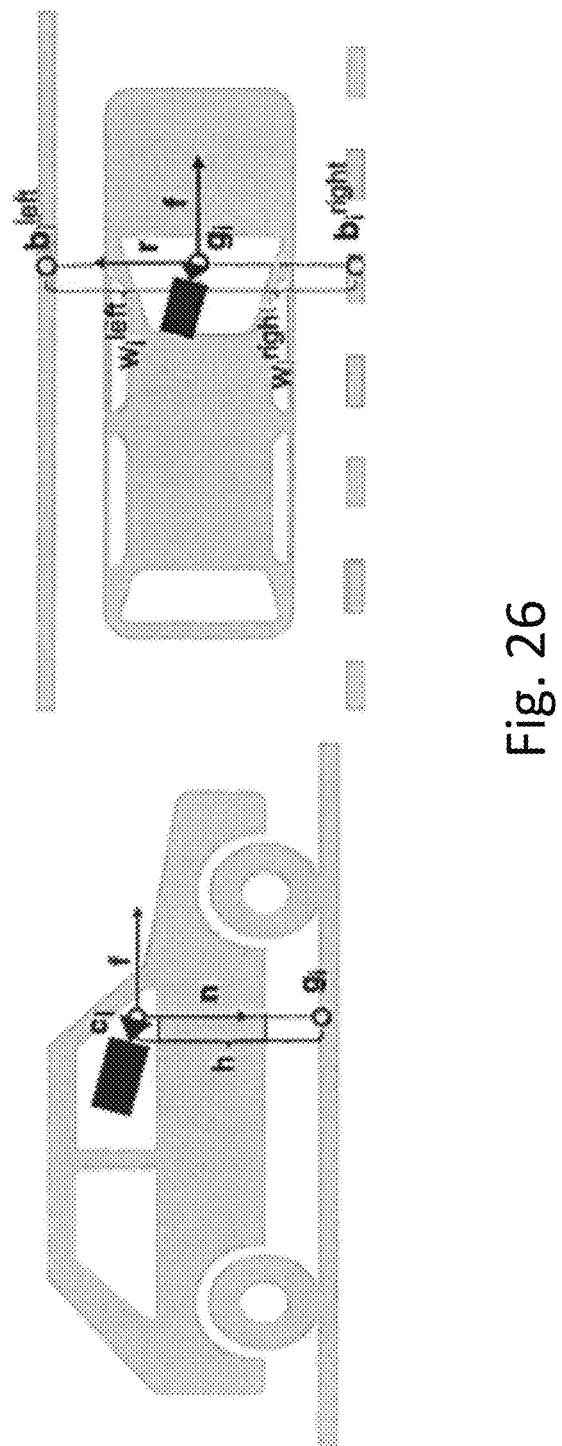
FIG. 26 shows reference points defined relative town image capture device of a vehicle.

FIG. 26 (top left) shows an example image from the collected data. In order to remove parts where the car moves very slow or stands still (which is common in urban environments), only frames that are at least 1 m apart according GPS are included. Finally, the recorded data is split into sequences of 200 m in length.

Figure 25:
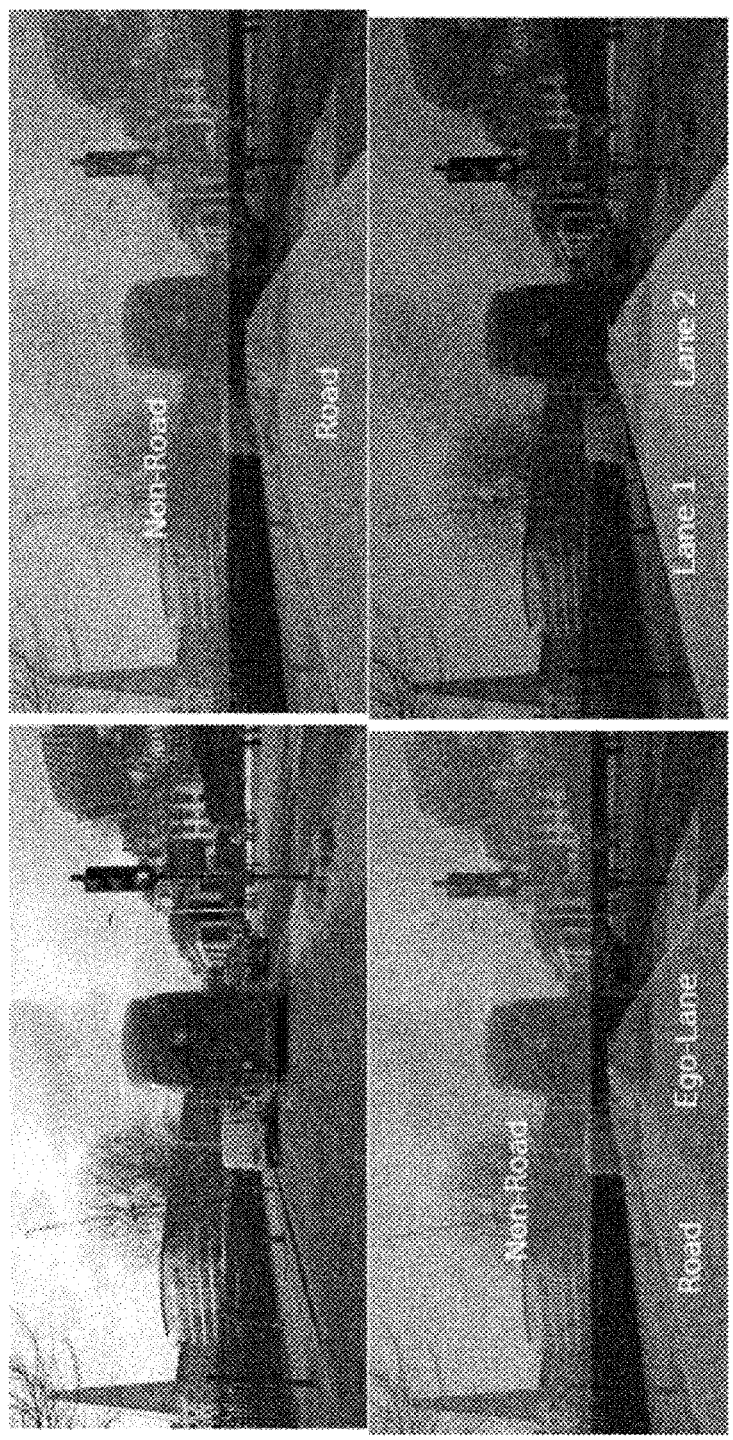
FIG. 25 shows successive annotation applied to a road image.

FIG. 25 shows an example road image (top left), including annotations for road (top right), ego-lane (bottom left) and lane instance (bottom right). Road and lanes below vehicles are annotated despite being occluded. Non-coloured parts have not been annotated, i.e. the class is not known.

Figure 3:
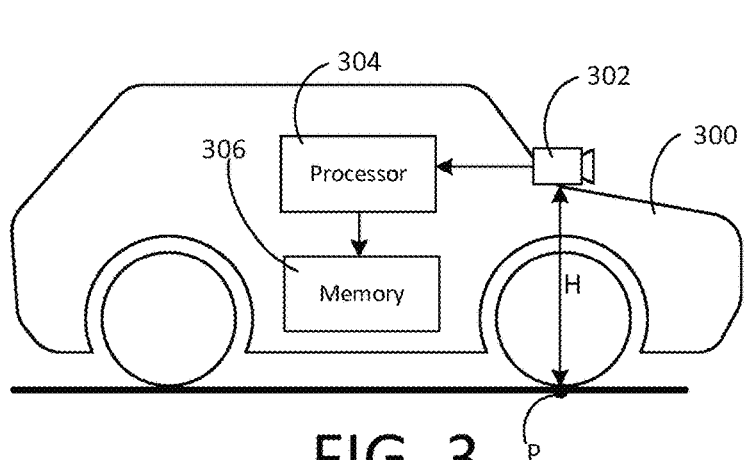
FIG. 3 shows a highly schematic block diagram of a vehicle for capturing road images to be annotated.

FIG. 3 shows a simplified block diagram of a vehicle 300 that can be used to capture road images to be annotated, that is, road images of the kind described above with reference to FIG. 1. Preferably, these images are captured as frames of short video segments recorded as the vehicle 300 drives along a road, in such a way as to allow the path travelled by the vehicle during the recording of each video segment to be reconstructed from the frames of that segment. The vehicle 300 may be referred to as a training vehicle, as a convenient shorthand to distinguish it from the autonomous vehicle 200 of FIG. 2. The training vehicle 300 is shown to comprise an image capture device 302, which can be a forward-facing or rear-facing image capture device, and which is coupled to a processor 304. The processor 304 receives the captured images from the image capture device 302, and stores them in a memory 306, from which they can be retrieved for use in the manner described below.

The vehicle 300 is a car in this example, but it can be any form of vehicle.

Underpinning the invention is an assumption that the path travelled by the human-driven training vehicle 300 extends along a road, and that the location of the road can therefore be inferred from whatever path the training vehicle 300 took. When it comes to annotating a particular image in the captured sequence of training images, it is the hindsight of the path that the training vehicle 300 subsequently took after that image was captured that allows the automatic annotation to be made. In other words, hindsight of the vehicle's behavior after that image was captured is exploited in order to infer the location of the road within the image. The annotated road location is thus a road location that is expected given the path subsequently travelled by the training vehicle 300 and the underlying assumptions about how this relates to the location of the road.

As described in further detail below, the path is determined by processing the captured images themselves. Accordingly, when annotating a particular image with an expected road location, for a forward-facing (resp. rear-facing) image capture device 302, the expected road location in that image is determined from the path travelled by the vehicle after (resp. before) that image was captured, as reconstructed using at least one of the subsequently (resp. previously) captured images in the sequence of captured images. That is, each image that is annotated is annotated using path information derived from one or more of the images captured after (resp. before) the image being annotated.

3 Video Annotation

Figure 27:
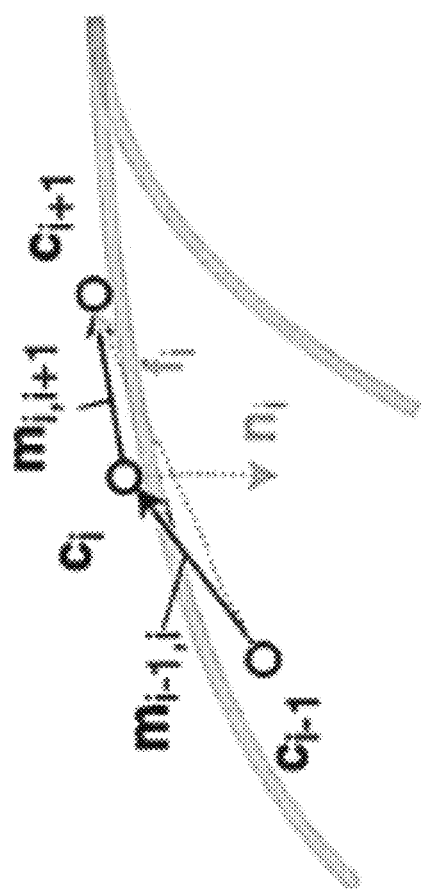
FIG. 27 shows further details of a road normal estimation process.

FIG. 27 shows the principles of the estimation of the lane border points $b_i^{left}$, $b_i^{right}$ at frame i. $c_i$ is the camera position at frame i (obtained via SfM), f is the forward direction and n is the normal vector of the road plane (both relative to the camera orientation), h is the height of the camera above the road, r is the horizontal vector across the lane and $w_i^{left}$, $w_i^{right}$ are the distances to the left and right ego-lane borders.

The initial annotation step is automated and provides an estimate of the road surface in 3D space, along with an estimate for the ego-lane (see Sec. 3.1). Then the estimates are corrected manually and further annotations are added in road surface space. The labels are then projected into the 2D camera views, allowing the annotation of all images in the sequence at once (see Sec. 3.2).

3.1 Automated 3D Ego-Lane Estimation

Given a video sequence of N frames from a camera with unknown intrinsic and extrinsic parameters, the goal is to determine the road surface in 3D and project an estimate of the ego-lane onto this surface. To this end, first OpenSfM [28]—a "structure-from-motion" algorithm—is applied to obtain the 3D camera locations $c_i$ and poses $R_i$ for each frame $i \in \{1, \ldots, N\}$ in a global coordinate system, as well as the camera focal length and distortion parameters.

The road is assumed to be a 2D manifold embedded in the 3D world. Furthermore, the local curvature of the road is low, and thus the orientation of the vehicle wheels provide a good estimate of the local surface gradient. The camera is fixed within the vehicle with a static translation and rotation from the current road plane (i.e. it is assumed the vehicle body follows the road plane and neglect suspension movement). Thus the ground point $g_i$ on the road below the camera at frame i can be calculated as $$g_i = c_i + hR_i n_i$$

where h is the height of the camera above the road and n is the surface normal of the road relative to the camera (see FIG. 26, left). The left and right ego-lane borders can then be derived as $$b_i^{left} = g_i + w_i^{left} R_i r$$

$$b_i^{right} = g_i + w_i^{right} R_i r \qquad (1)$$

where r is the vector within the road plane, that is perpendicular to the driving direction and $w_i^{left}$, $w_i^{right}$ are the offsets to the left and right ego-lane borders. See FIG. 26 (right) for an illustration. A simplifying assumption is made that the road surface is flat perpendicular to the direction of the car motion (but there is no assumption that the road is flat generally—if the ego path travels over hills, this is captured in the ego path).

Given a frame i, all future lane borders $$b_j (b_j \in \{b_j^{left}, b_j^{right}\} \text{ and } j > i)$$

can be projected into the local coordinate system via $$\hat{b}_j = R_i^{-1}(b_j - c_i) \qquad (2)$$

Then the lane annotations can be drawn as polygons of neighbouring future frames, i.e. with the corner points $\hat{b}_j^{left}$, $\hat{b}_j^{right}$, $\hat{b}_{j+1}^{right}$, $\hat{b}_{j+1}^{left}$.

This makes implicitly the assumption that the lane is piece-wise straight and flat between captured images. The following parts describe how to measure or otherwise obtain the following quantities:

$$h, n, r, w_i^{left} \text{ and } w_i^{right};$$

Note that h, n and r only need to be estimated once for all sequences with the same camera position.

The camera height above the road ft is easy to measure manually. However, in case this cannot be done (e.g. for dash-cam videos downloaded from the web) it is also possible to obtain the height of the camera using the estimated mesh of the road surface obtained from OpenSfM. A rough estimate for h is sufficient, since it is corrected via manual annotation, see the following section.

FIG. 27 shows the principles of the estimation of the road normal n and forward direction $f_i$ at a single frame i. The final estimate is an aggregate over all frames.

The road normal n is estimated based on the fact that, when the car moves around a turn, the vectors representing it's motion m will all lie in the road plane, and thus taking the cross product of them will result in the road normal, see FIG. 27. Let $$m_{i,j}$$

be the normalised motion vector between frames i and j, i.e.

$$m_{i,j} = \frac{c_j - c_i}{\|c_j - c_i\|}.$$

The estimated road normal at frame i (in camera coordinates) is $$n_i = R_i^{-1}(m_{i-1,i} \otimes m_{i,i+1}),$$

where $\otimes$ denotes the cross-product (see FIG. 27). The quality of this estimate depends highly on the degree of the previous assumptions being correct. To get a more reliable estimate, $n_i$ may be averaged across the journey, and weighted implicitly by the magnitude of the cross product:

$$n = \frac{1}{\sum_{i=2}^{N-2} \|n_i\|} \sum_{i=2}^{N-2} n_i \quad (3)$$

The normal may only be estimated during turns, and thus this weighting scheme emphasises tight turns and ignores straight parts of the journey.

r is perpendicular to the forward direction f and within the road plane, thus $$r = f \otimes n \quad (4)$$

The only quantity left is f, which can be derived by using the fact that $$m_{i-1,i+1}$$

is approximately parallel to the tangent at $c_i$, if the rate of turn is low. Thus it is possible to estimate the forward point at frame i $$f_i = R_i^{-1} m_{i-1,i+1}$$

(see FIG. 27). As for the normal, $f_i$ may be averaged over the journey to get a more reliable estimate:

$$f = \frac{1}{\sum_i a_i} \sum_{i=2}^{N-2} a_i f_i \quad (5)$$

$$a_i = \max(m_{i-1,i}^\top m_{i,i+1}, 0) \quad (6)$$

In this case, the movements are weighted according the inner product in order to up-weight parts with a low rate of turn, while the max assures forward movement.

The quantities $$w_i^{left} \text{ and } w_i^{right}$$

are important to get the correct alignment of the annotated lane borders with the visible boundary.

To estimate these, it may be assumed that the ego-lane has a fixed width w and the car has travelled exactly in the centre, i.e.

$$\omega_i^{left} = \frac{1}{2}\omega \text{ and } \omega_i^{right} = -\frac{1}{2}\omega$$

are both constant for all frames. In an extension (see the following section), this assumption is relaxed to get an improved estimate through manual annotation.

Figure 28:
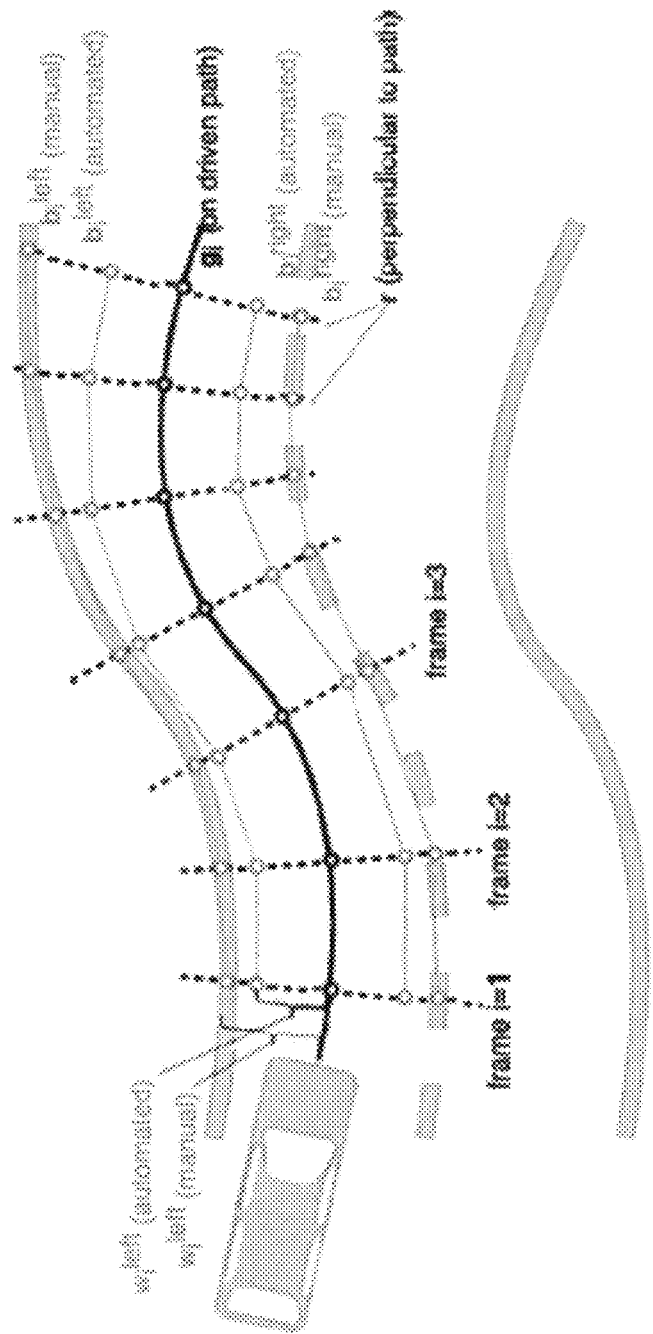
FIG. 28 shows a top-down view of an ego-lane estimate.

In practice, a sequence is selected with a many turns within the road plane to estimate n and a straight sequence to estimate f. Then the same values are re-used for all sequences with the same static camera position. Only the first part of the sequence is annotated, up until 100 m from the end, since otherwise not sufficient future lane border points can be projected. A summary of the automated ego-lane annotation procedure is provided in Annex A (Algorithm 1) and a visualisation of the automated border point estimation is shown in FIG. 28 (see below) and labelled as such.

Further details are described below.

Figure 4:
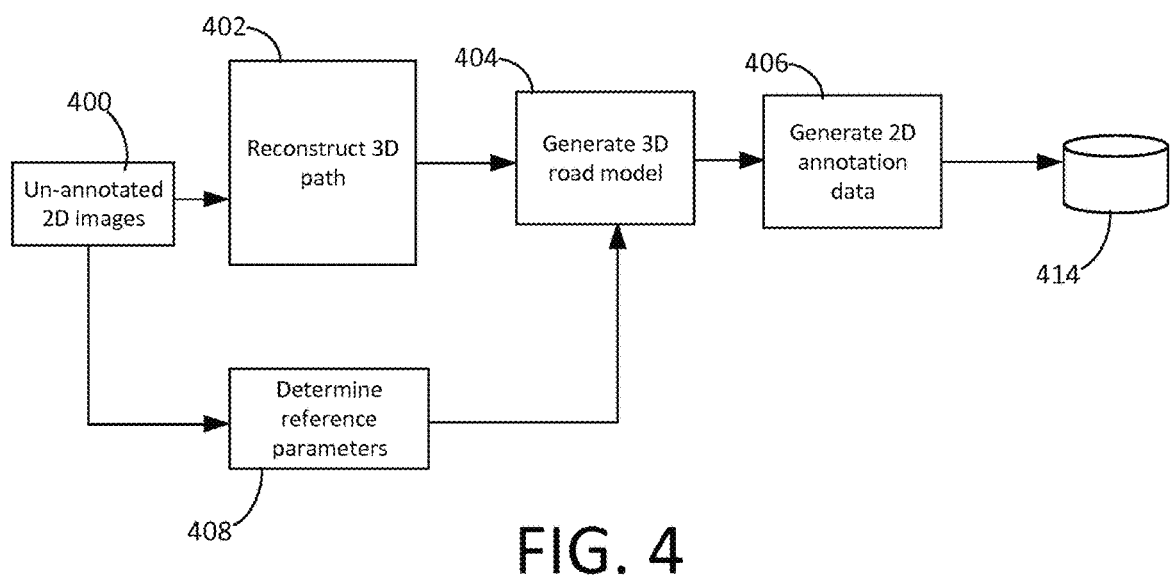
FIG. 4 shows a schematic block diagram of an image processing system.
Figure 4A:
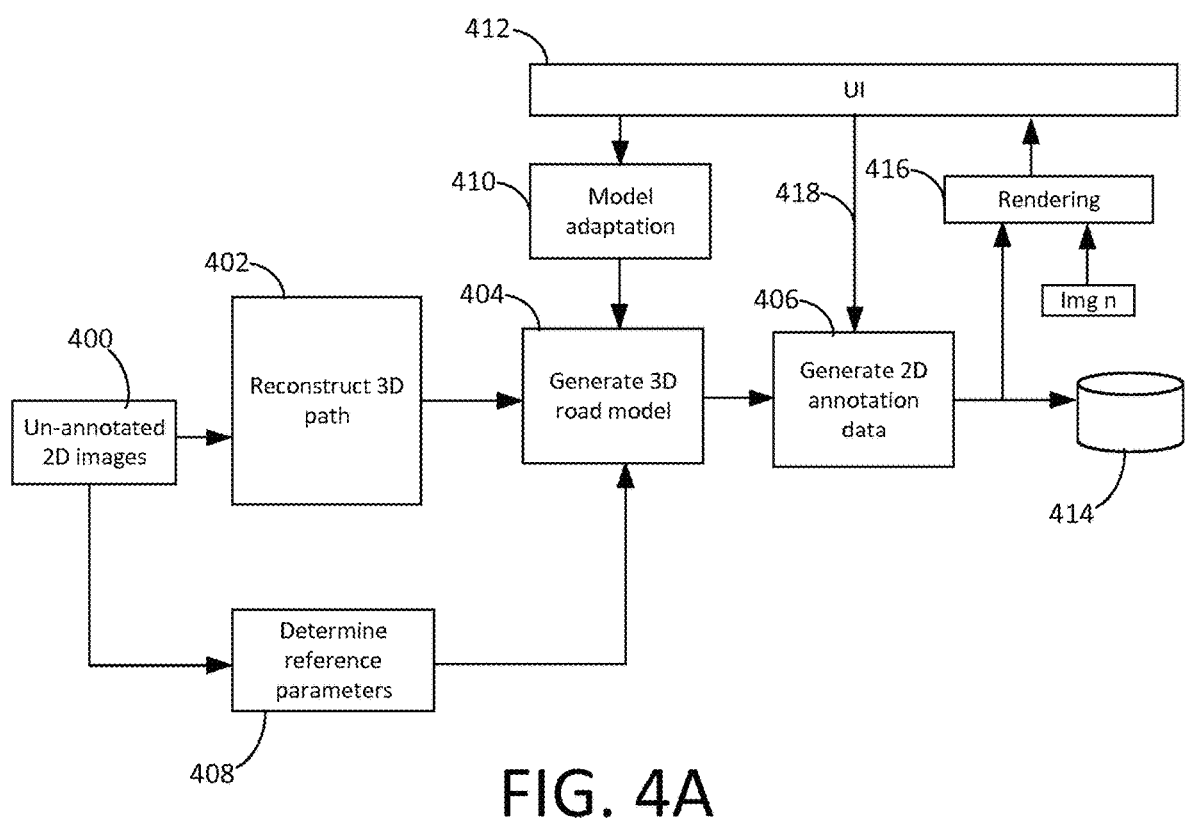
FIG. 4A an extension of the system of FIG. 4.

FIG. 4 shows a schematic block diagram of an image processing system which operates in accordance with the present invention so as to automatically generate annotation data for training images captured in the manner described above with reference to FIG. 3. The annotation data marks expected road locations within the images, where those locations are inferred using the aforementioned assumptions. FIG. 4A shows an extension of this system, which is described below. The system of FIG. 4A includes all of the components of FIG. 4, and all description of FIG. 4A applies equally to FIG. 4A.

Figure 5:
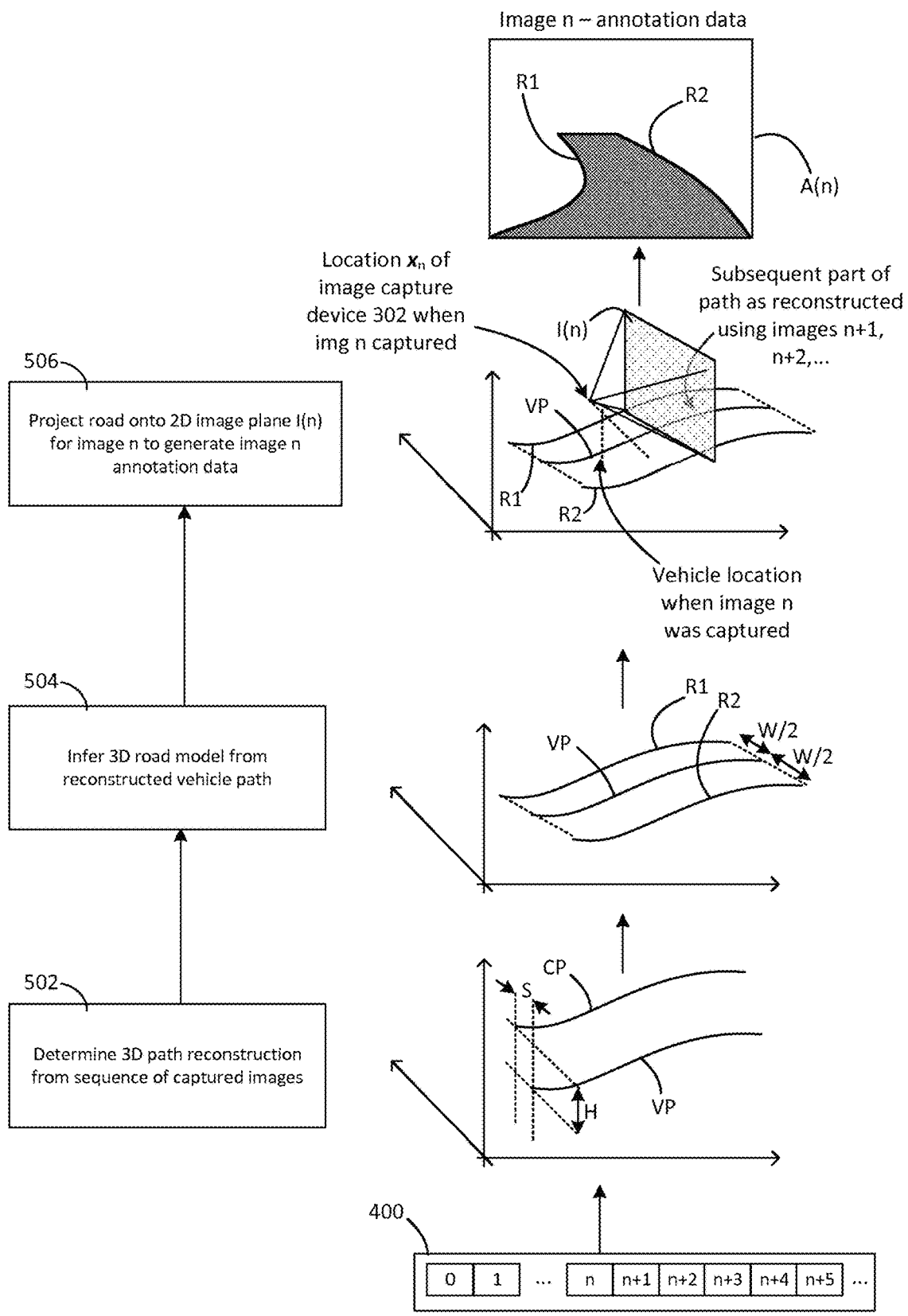
FIG. 5 shows on the left hand side a flowchart for an automatic image annotation process, and on the right hand side an example illustration of the corresponding steps of the method.

FIG. 5 shows on the left hand side a flowchart for the automatic image annotation process implemented by the image capture system, and on the right hand side an example illustration of the corresponding steps.

The image system of FIGS. 4 and 4A and the process of FIG. 5 will now be described in parallel.

The image processing system of FIG. 4 is shown to comprise a path reconstruction component 402, a road modelling component 404 and an image annotation component 406.

The path reconstruction component 402 receives a sequence of captured two-dimensional (2D) images 400 and processes them to create a three-dimensional (3D) reconstruction of the path travelled by the vehicle from the captured sequence of images (Step 502, FIG. 5).

To the right of Step 502, FIG. 5 shows two reconstructed paths in three-dimensional space.

The first path, labelled CP (camera path), is a 3D reconstruction of the path travelled by the image capture device (camera) 302 of the training vehicle 300. Techniques for reconstructing the path travelled by a moving camera from a sequence of images captured by the camera as it moves are known in the art, and are therefore not described in detail herein.

It is possible to recreate the path from other data (accelerometer, highly accurate GPS etc.) however making the reconstruction be only from the video beneficially makes the cost of capturing the data very cheap, due to the fact that even a basic dashcam can be used for data collection, not an expensive car containing expensive accelerometers, expensive accurate GPS etc.

The second path, labelled VP (vehicle path), is a reconstruction of the path travelled by the training vehicle 300, which is defined as the path travelled by a point that lies approximately half way across the width of the training vehicle 300, i.e. equidistant from the right-hand and left-hand sides of the training vehicle, and below the image capture device 300 at approximately road level (labelled P in FIGS. 3 and 3A). That is, at road height and along a center-line (C, FIG. 3A) of the vehicle 300 that extends vertically and lies at the halfway point along the width of the vehicle 300.

Note that it is not essential for these points to be exactly equidistant—the method has been found to give accurate results even when the points are not equidistant.

Figure 3A:
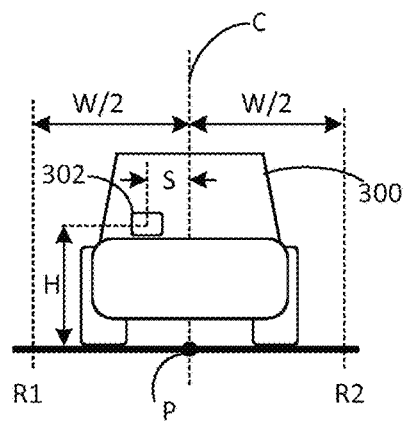
FIG. 3A shows a schematic front-on view of a vehicle.

It is straightforward to determine the vehicle path VP at ground level from the camera path CP if the height of the camera 302 above the surface of the road, labelled H in FIGS. 3, 3A and 5, the horizontal offset of the camera 302 from the center line C, labelled S in FIGS. 3A and 5, and the orientation of the camera relative to the vehicle are known. The relative orientation of the camera can be captured as a "forward point" and "horizon line", as defined below.

Note that the examples shown to the right of FIG. 5 are illustrative, but not exhaustive, and are only intended to illustrate by way of example more general principles according to which the 3D camera path CP can be used to infer the location of road structure, using a small number of reference parameters.

From the 3D path reconstruction, the road modelling component 404 creates a 3D model (602, FIG. 6) of the road the vehicle is assumed to have travelled along (Step 504, FIG. 5).

In the example shown to the right of Step 504, the road model is formed of two geometric curves R1, R2, corresponding to assumed lane boundary locations, which are defined as lying parallel to, and at the same height as, the vehicle path VP, on either side of the vehicle path VP and each at a distance W/2 from it, where W is an assumed road or lane width.

This is based on the assumptions that the training vehicle 300 is travelling along a road lane, the direction of travel of the training vehicle 300 is approximately parallel to the actual lane boundaries of that lane, and that it is driven in approximately the center of the lane.

The expected road locations can for example correspond to an edge of the road itself (so as to mark the road, or the non-drivable area beside the road), or to lane locations of lanes within the road.

In general, the automated annotation techniques can be used to mark the locations of what is referred to herein as "parallel structure", i.e. structure that is expected to run at least approximately parallel to the path driven by the vehicle, or more generally to expected structure that is expected to have a specific orientation relative to the vehicle path. This can be road structure such as roads, lanes, non-drivable areas assumed to lie parallel to the vehicle path, junctions assumed to extend perpendicular to the vehicle path, or real-world parallel structures that might be encountered by vehicles other than cars, such as runways (in the case of autonomous drones, planes etc.) etc. Accordingly, all description of the 3D road model applies equally to any other form 3D structure model of an environment in which the vehicle travelled, for which expected parallel structure can be automatically determined using the methods described herein.

Different assumptions can be used to accommodate different types of parallel structure, on top of the underlying assumption that they lie parallel to the path that was actually travelled by the training vehicle 300.

Herein, the description may make specific reference to roads or lanes, and to related parameters such as road or lane width. However, it will be appreciated that the description applies to any parallel road structure, and that any references to road or lane width (and the like) apply generally to a width parameter determined for the expected parallel structure.

The 3D road model is used by the image annotation component 406 to generate 2D annotation data for marking the individual 2D training images individually with expected road locations (Step 506, FIG. 5).

As illustrated to the right of Step 506 in FIG. 5, the annotation data A(n) for the nth 2D image in the sequence (image n, which can be any image in the sequence of captured training images) is generated by performing a geometric projection of the 3D road model onto the plane of that image, labelled I(n). In this example, this means projecting the 3D road boundaries R1, R2 onto the image plane I(n), such that the projection of those boundaries in the image marks where the road boundaries are assumed to lie in image n.

The image plane I(n) is a plane corresponding to the field of view of the camera 302 when image n was captured, and is thus located at a point corresponding to the location of the vehicle when image n was captured.

A parameter computation component 408 computes various "reference parameters" that are used to construct the 3D model from the reconstructed vehicle path and to perform the geometric projection. These reference parameters comprise the following image capture parameters, relating to the position and orientation of the image capture device 302 of the training vehicle 300:

1) The height H of the camera 302 above the road;
2) The horizontal offset S of the camera from the center line C;
3) The orientation of the camera 302 relative to the vehicle, which can be captured as:
    a. A "forward point" of the camera 302 (as defined below), and
    b. A "horizon line" (as defined below) of the camera;

and additionally:

4) The width W of the road/lane.

These are used in the manner described briefly above, and further details of how they computed are used are described below. For now suffice it to say that these parameters are computed from the captured training images 400 themselves, which has various benefits that are described later.

The annotation data is stored in electronic storage 414, from which it can be accessed or retrieved for use in the training process described above with reference to FIG. 1. In this process, ultimately the automatic structure detection component 102 is learning from the human driver's ability to keep the vehicle 300 in approximately the center of the road most of the time whilst the training images are captured.

3.2 Manual Corrections and Additional Annotations

An annotation interface provides a human annotator with the ability to view the frames in a batch individually with the currently rendered lanes projected into the images. These lanes can be widened, narrowed and moved by the annotator in the most convenient frame and these changes to the lane structure will be projected into all other frames in the batch, providing a clear advantage over annotation of all of the image individually.

FIG. 28 shows a Visualisation of the ego-lane estimate, seen from above. The automated estimate is and manual correction are labelled, respectively, as $w_i^{left}$(automated)

$w_i^{left}$(manual)

Initially, all $w_i^{left}$ and $w_i^{right}$ are set to a constant value, and thus the estimate follows the driven path, but the lane borders are not correctly annotated as can be seen. Then the annotators correct the $w_i^{left}$ and $w_i^{right}$, after which the estimate improves.

Figure 18:
Figure 19:
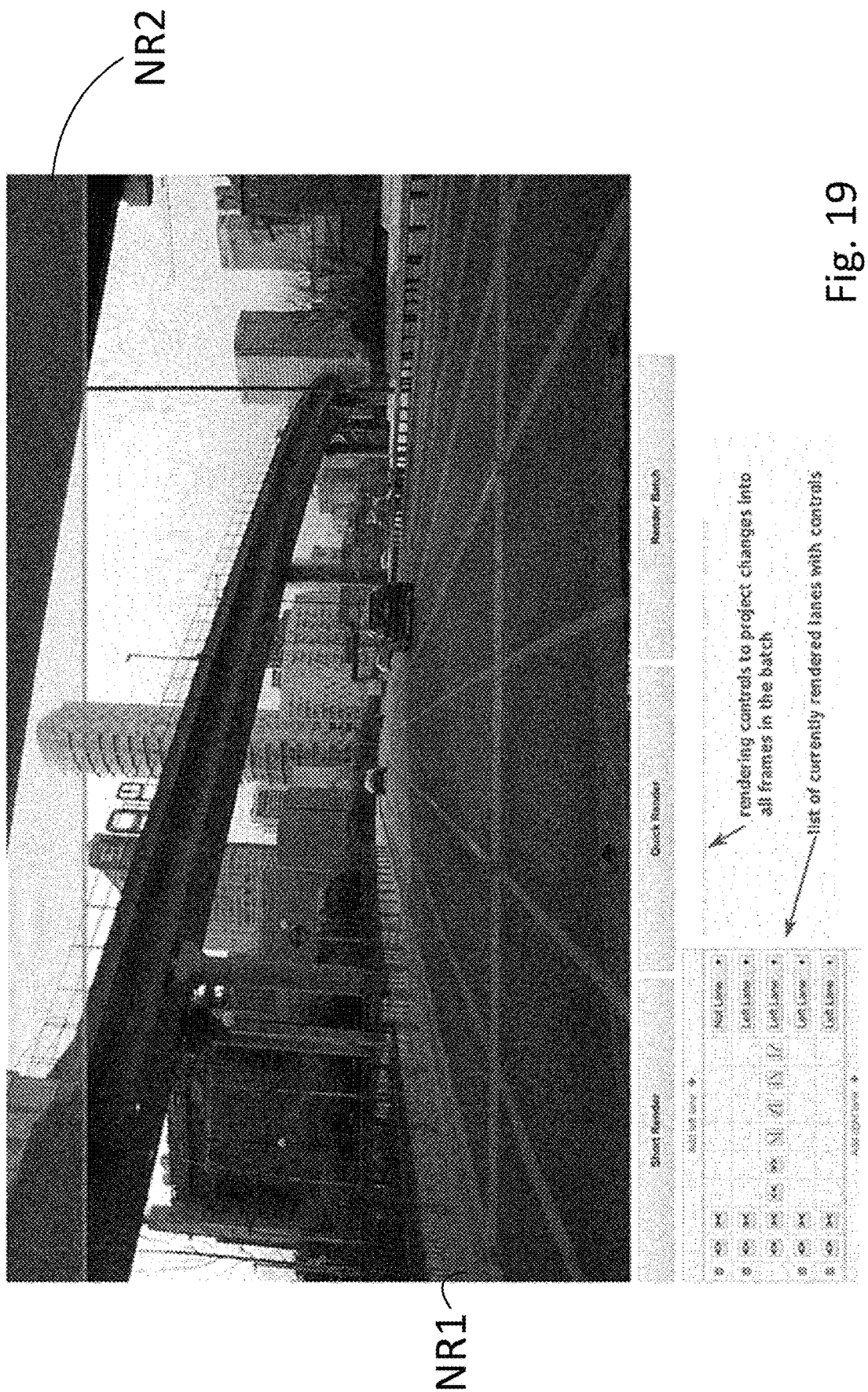

FIGS. 18 to 24 shows examples of the annotation interface used by the annotators. In FIG. 18, in the centre of the image, the ego-path can be seen projected into this frame. In the bottom-left, the annotator is provided with controls to manipulate currently rendered lanes (narrow, widen, move to the left or right, move the boundaries of the lane etc.) and add new lanes. In FIG. 19, the annotator is provided with means to adjust the camera height, to match the reconstruction to the road surface, and the crop height, to exclude the vehicles dash or bonnet. All annotations are performed in the estimated 3D road plane, but immediate feedback is provided via projection in the 2D camera view. The annotator can easily skip forward and backward in the sequence to determine if the labels align with the image, and correct them if needed. An example of a corrected sequence is shown in FIG. 27 (see above).

In addition to the lanes on the road, a strip along the side of road, denoted by reference sign NR1, is annotated as 'non-road'. Further the whole upper part of each image (top strip NR2) is annotated as non-road, where the size is adjusted manually by the annotators. FIG. 25 shows an example of the rendered annotations.

The above is implemented in the extension of FIG. 4A, In which a rendering component 416 is provided, which can render, via a user interface (UI) 412, an individual training image (img n) marked with the expected road annotations determined for that image. Thus a user can check how closely the expected road structure corresponds to the actual road structure visible in the image, and make corrections where necessary.

An output of the UI 412 is shown connected to an input of the image annotation component, via connector 418, to denote the fact that the user can modify the annotation data A(n) for an individual image via the UI 412, in order to better align the assumed lane boundaries R1, R2 with the actual lane boundaries in that image (only). This can be useful for accommodating "one-off" discrepancies, caused for example by unusual localized road structure.

A model adaptation component 410 is also provided to allow efficient manual adaptation of the annotation data via the UI 412 across multiple images simultaneously. This works by allowing the user to adapt the 3D road model with reference to a single image and its rendered annotation data, in order to better align the road boundaries in that image. However, because the 3D road model is being adapted (rather than just the individual image's annotation data A(n)), these adaptations can also be applied to the annotation data for other images, without the user having to manually adapt the annotation data for those other images. For example, a user can adjust the assumed lane width W to better fit one image, and because the road model is being adapted to the new lane width, the annotation data for other images can be automatically adapted based on the adapted model with the new lane width W. This is described in further detail below with reference to FIG. 6.

The above-described components of the image processing system of FIGS. 4 and 4A are functional components of the image processing system representing functions performed by the image processing system. These functions are implemented in software, that is by executable instructions (code) that are stored in memory and executed by a processor or processors of the image processing system (not shown), which can be formed of one or more general purpose processing units (such as CPUs), more specialized processing units (such as GPUs) or any combination thereof. As will be appreciated, these components represent high-level functions, which can be implemented using a variety of code structures. The arrows in FIG. 4 generally denote high-level interrelationships between these high-level functions, and do not necessarily correspond to any specific arrangement of physical or logical connections. The steps of FIG. 5 are computer-implemented steps, which the instructions cause the image processing system to perform when executed on the one or more processors.

Figure 13:
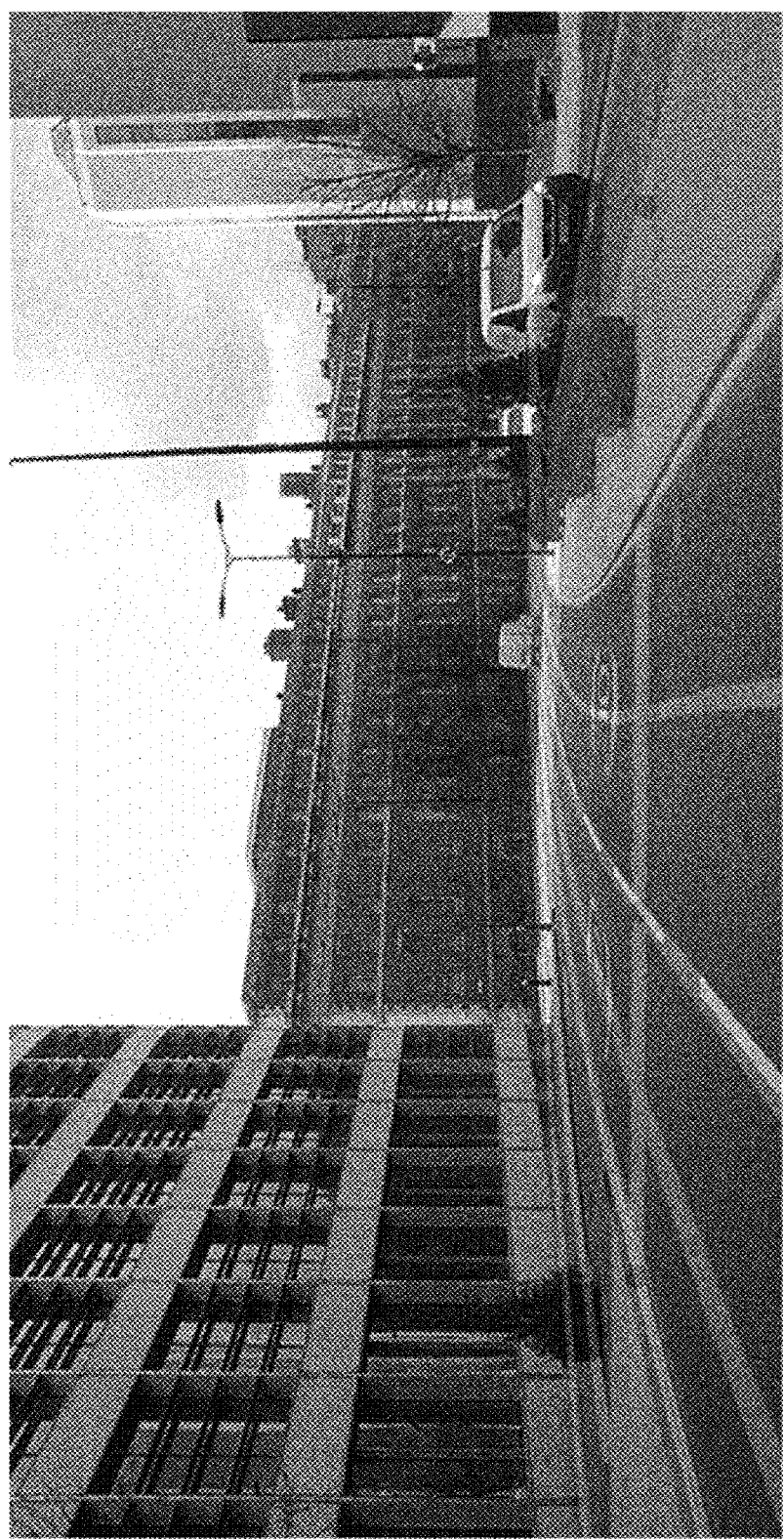
FIG. 13 shows an example of an annotated road image.

Details of Example Implementation:

An example of an annotated image is shown in FIG. 13. In FIG. 13, two drivable lanes are marked: the ego lane towards the middle of the image, and another drivable lane to the left of the image. Two non-drivable regions are marked either side of those lanes, as is a lane for traffic travelling in the other direction on the far right, separated from the ego lane by one of the non-drivable areas.

As indicated above, the methodology exploits the following observations and assumptions:

1) When humans drive cars they mostly follow a path that remains close to the centre of a lane on the road. Thus, if a video camera is placed facing forward (or alternatively backwards) in a human driven car then the path that the camera traces out when projected down onto the ground and expanded to the width of a lane will (mostly) outline where the lane lies.
2) Having found the outline of where the lane lies, then for each image in the video this outline of the lane under the car can be projected back into the image and provides (nearly) exactly the annotation required to mark the lane position.

Preferred embodiments of the invention achieve this with low cost equipment, as explained later.

Determining Path and Reference Parameters:

In order generate the lane position and project it back into each image, as indicated above the following need to be known or deduced:

The path in 3D space that the camera 302 follows (CP, FIG. 5);

The orientation of the camera 302 within the car 300, which can be represented using the following parameters:
  The forward point, defined as the pixel that the car appears to travel towards when travelling in a straight line,
  The horizon line, defined as a line on the image that appears to be parallel to the road;

The height of the camera above the road surface (H, FIGS. 3, 3A and 5)

The left/right position of the camera within the car (captured as the separation S in FIGS. 3A and 5); and The width of the lane (W, FIGS. 3A and 5).

The image processing techniques described below allow all the above to be determined with inexpensive and un-calibrated equipment, such as a mobile phone or a dash-cam costing a few hundred pounds, or other low cost consumer equipment. This is because they can be computed from the images captured by the training vehicle 300, using the image processing techniques described below.

3) The 3D path of the camera CP can be deduced by post processing captured videos from un-calibrated cameras using existing visual SLAM (simultaneous localization and mapping) techniques. Software packages such as OpenSFM and ORB-SLAM can be used to generate accurate camera path information.

Such techniques can be used to construct a 3D map of the environment travelled by the training vehicle 300, whilst simultaneously tracking the vehicles' location within that environment.

Figure 7:
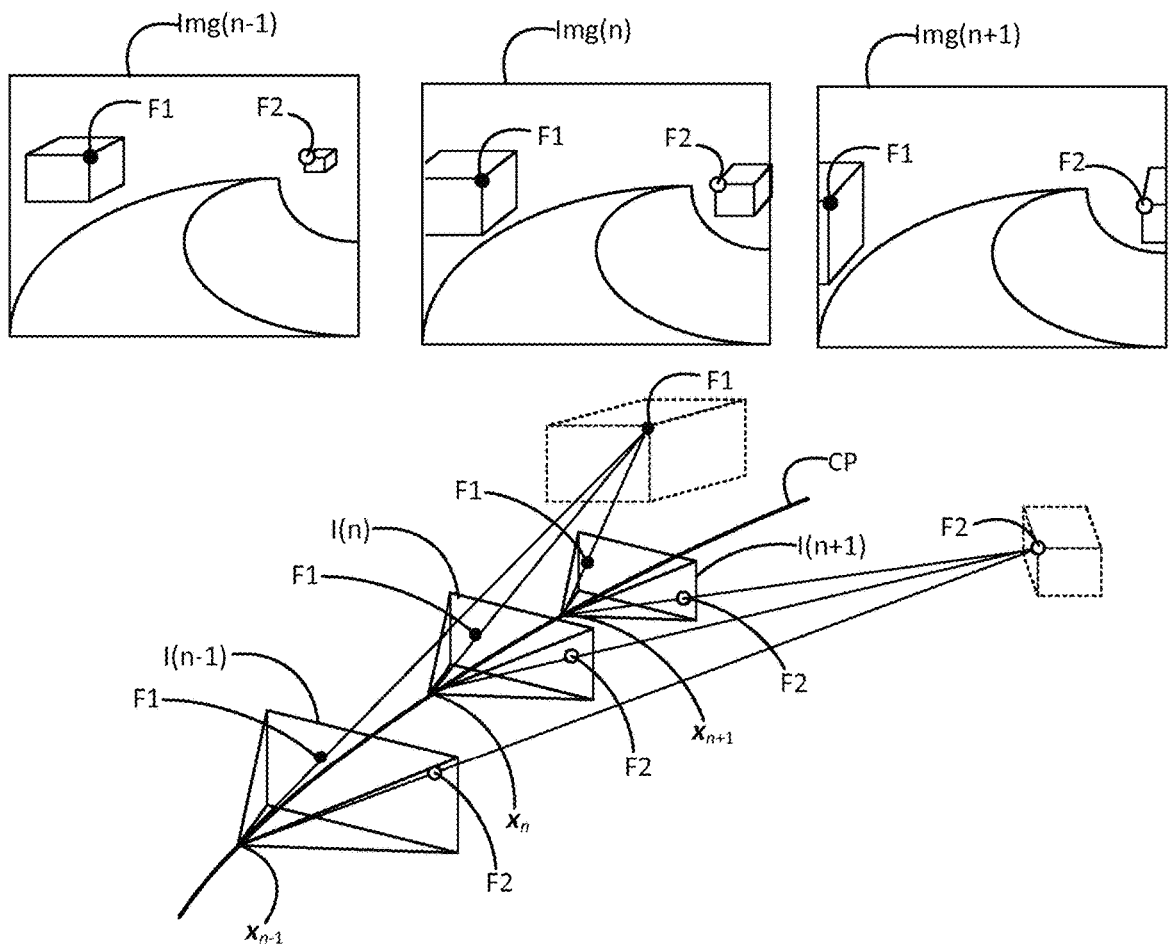
FIG. 7 illustrates principles of a simultaneous localization and mapping technique (SLAM) for reconstructing a vehicle path.

Some of the underlying principles of image-based SLAM are briefly illustrated by way of example with reference to FIG. 7. The top part of FIG. 7 shows three captured images—img(n−1), img(n) and img(n+1)—of a real-world environment, at different times and from different but nearby locations. By identifying distinctive reference features that appear within the images—such as those labelled F1 and F2—and matching them up across the images, triangulation can then be used to construct a 3D model of those features, as illustrated in the lower part of FIG. 7. For each of the captured images img(n−1), img(n), img(n+1), a 3D location of the camera 302 at the time that image was captured—labelled $x_{n-1}, x_n, x_{n+1}$ respectively—is estimated, as is an orientation of the camera's field of view within 3D space. For each of the images img(n−1), img(n), img(n+1), a respective image plane I(n−1), I(n), I(n+1) is defined as a plane normal to and intersecting the camera's filed of view when that image was captured, at an arbitrary non-zero distance from the camera location $x_{n-1}, x_{n+1}$. The camera locations and orientations are selected based on ray-tracing principles applied to the reference features F1 and F2, such that for each of the camera locations $x_{n-1}, x_{n+1}$, the rays (straight lines) from each of the references features F1, F2 to that camera location intersect the corresponding image plane I(n−1), I(n), I(n+1) at locations that at least approximately correspond to the locations at which that reference feature appears in the corresponding images, i.e. that feature's pixel location within the images. The camera path CP can then be reconstructed from the resulting sequence of camera locations $x_{n-1}, x_n, x_{n+1}$.

Note that this 3D model constructed as part of the SLAM process is distinct from the 3D model constructed by the modelling component 404. The former is in the form of a surface map constructed based on image triangulation, whereas the later represents expected structure that is inferred based on the vehicle path, which in turn is determined from the image capture device locations derived in performing the SLAM process.

Figure 7A:
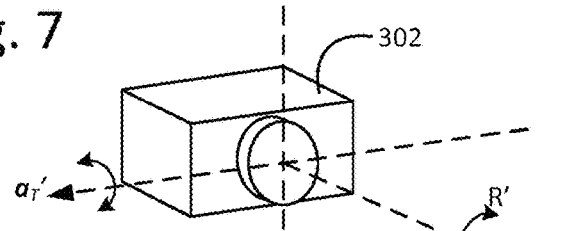
Figure 7B:
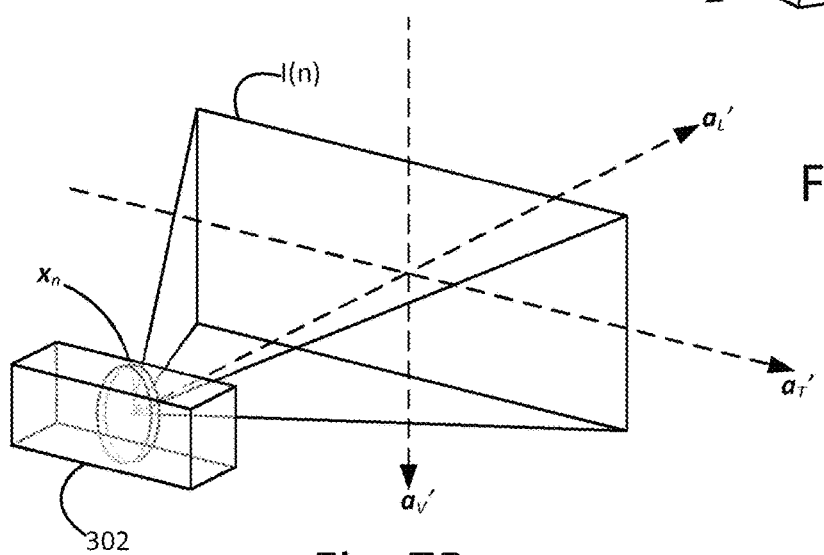

With reference to FIGS. 7A and 7B, the 3D orientation of the camera 302 can be represented using pitch (P'), roll (R') and yaw (Y') angles. A longitudinal axis $a_L'$ can be conveniently defined as parallel the camera's optical axis, with transverse and vertical axes $a_T'$, $a_V'$ corresponding to the horizontal and vertical orientations within the image plane (i.e. to the directions that appear as horizontal and vertical in the captured images), with the camera's pitch P', roll R' and yaw Y' defined as angles about the camera's transverse, longitudinal and vertical axes $a_T'a_L'$, $a_V'$ (camera axes), respectively. Vector notation is used herein, with $a_T'a_L'$, $a_V'$ being unit vectors in the direction of the corresponding axis. With this definition, the image plane I(n) lies perpendicular to the camera's transverse axis and is horizontally/vertically aligned with the transverse/vertical camera axes.

Such SLAM techniques do in fact generate surface reconstructions of the environment. Whilst such surface reconstructions could be used be used to determine road/lane positions directly in theory, generally the quality of the surface reconstructions is not sufficient to do so in practice. However, the quality of the motion of the camera through the 3D scene is good, and thus provides a sufficiently accurate reconstruction of the camera path CP (this is because the camera positions are based on order hundreds of feature points where as surface positions are only based on a handful of feature points), which in turn allows the road/lane positions to be inferred using the present techniques, with sufficient accuracy.

Note that some of these techniques can also automatically deduce the camera characteristics such as focal length and even lens distortion parameters. It may be possible to use such parameters to optimize the present techniques but they are not essential.

Figure 14:
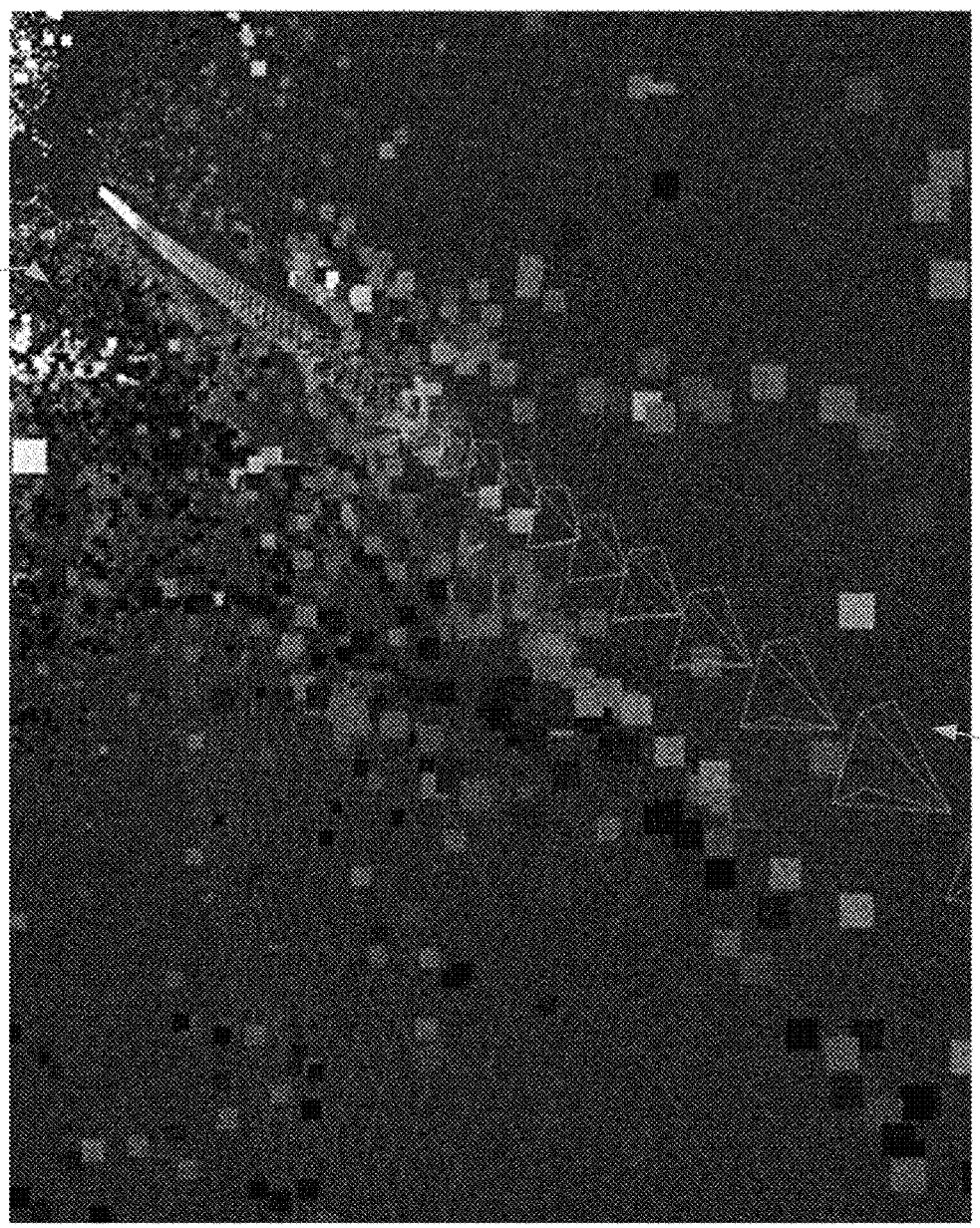
FIG. 14 shows an example SLAM output.

An example image of an SLAM reconstruction of camera positions moving through a point cloud world is shown in FIG. 14. The sequence of pyramid structures labelled 1400 represent the locations and orientation of the image capture device when the different images were taken, as estimated via the SLAM process. Collectively these define the camera path CP. The blocks labelled 1402 constitute a 3D surface map generated as part of the SLAM process. Both of these aspects are described in further detail later.

The remaining reference parameters are computed by the parameter computation component 408 via image processing, as described below. First some of the underlying considerations are briefly introduced.

Figure 8:
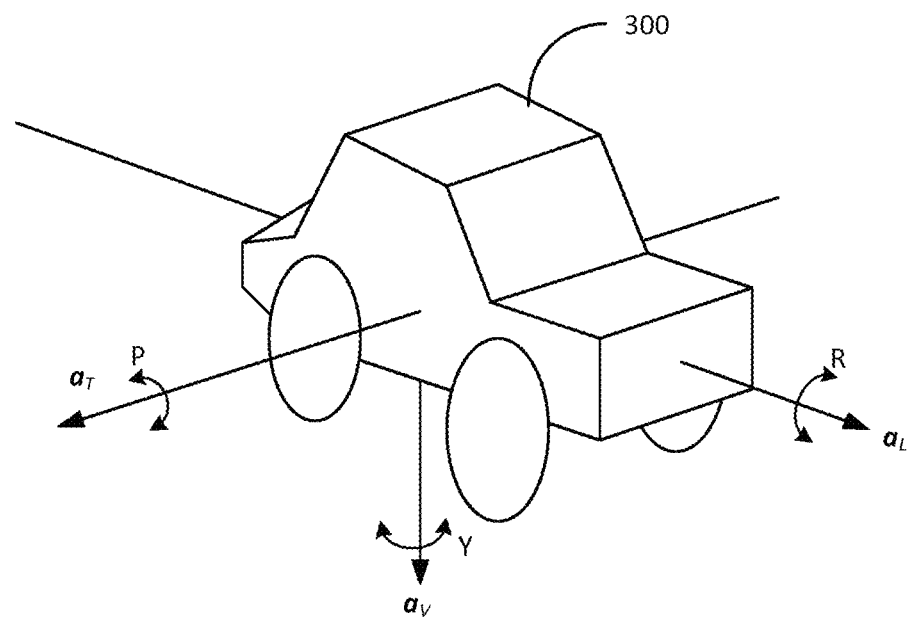
FIG. 8 shows a schematic perspective view of a vehicle.

With reference to FIG. 8, the 3D orientation of the training vehicle 300 can be defined in the same way as the camera. Here, the vehicle's pitch, roll and yaw are labelled P, R and Y respectively, and the training vehicle's transverse, longitudinal and vertical axes (vehicle axes) are represented by unit vectors $a_T$, $a_L$, $a_V$ respectively. The longitudinal axis corresponds to the direction in which the vehicle travels when travelling in a straight line (forward direction). The vertical axis is the direction normal to the road surface (that is, to the plane in which the contact points between the vehicle's wheels and the road lie). The transverse axis runs along the width of the vehicle 300, perpendicular to the longitudinal and vertical axes.

Note, unless otherwise indicated, the term "absolute" herein is used herein to refer to orientation and locations within the environment in which the vehicle is travelling. That is, as defined relative to an (arbitrary) global coordinate system of a global frame of reference of the environment in which the vehicle moves. This can be defined as an inherent part of the SLAM process. This is the coordinate system in which the reconstructed vehicle path, the orientation of the image capture device within the environment (absolute orientation) and the surface reconstruction are defined.

The term "relative" is used to refer to locations and orientations relative to the vehicle, that is, defined relative to a coordinate system of the vehicle, such as the coordinate system defined by the vehicle axes $a_T$, $a_L$, $a_V$.

Figure 9:
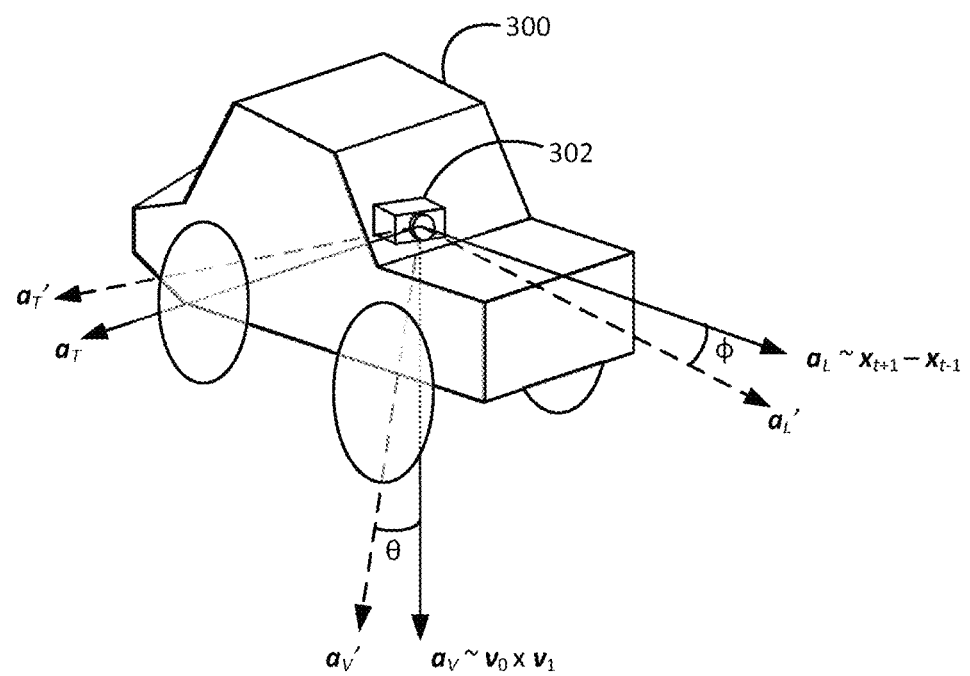
FIG. 9 shows a schematic perspective view of a vehicle equipped with at least one image capture device.

With reference to FIG. 9, the method does not require the orientation of camera 302 to be perfectly aligned with the orientation of the training vehicle 300. Angular misalignment of the camera axes relative to the vehicle axes is acceptable, because this misalignment can be detected and accounted for using the techniques described below.

4) The angular orientation of the camera within the car—i.e., the angular offset between the camera's longitudinal axis $a_L'$ and the vehicle's longitudinal axis $a_L$ (that is, the vehicle's longitudinal axis $a_L$ as measured within a frame of reference of the image capture device, i.e. in a reference frame in which the image capture device's orientation remains fixed)—can be deduced automatically by using the fact that when the car drives straight the vector of motion of the car will be parallel to the car body (i.e. the vehicle's longitudinal axis) and thus the camera orientation relative to the car body can be calculated. This orientation is captured as the forward point of the camera, defined to be the pixel that the car appears to head towards when travelling in a straight line (as noted above).

It is not possible to rely on there being sections of the video where the car travels in a perfectly straight line. To overcome the fact that the car may never travel in a perfectly straight line the following approach is taken.

Three equidistant points on the path are taken, the outer two are joined and this vector is used as an approximation of the forward direction at the central point. This approach is continuously averaged weighted by the dot product of the vectors between the central point and the two outer points. Thus, times when the car is travelling nearly straight are weighted much more strongly than times when the car is turning. Using this method can produce sub-pixel accuracy.

Figure 15:
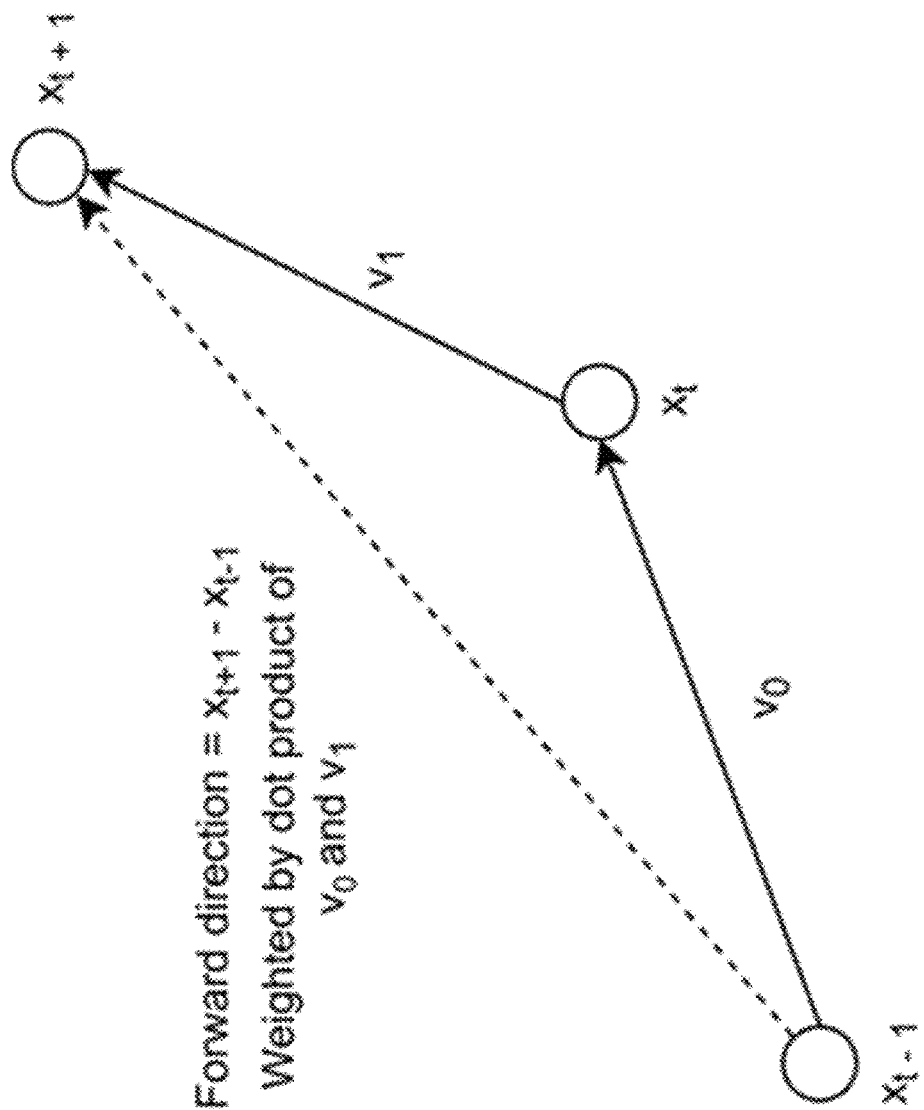
FIG. 15 illustrates certain principles of an image-based measurement direction.

This is illustrated in FIG. 15.

In other words, this exploits the observation that the vector difference $x_{t+1}-x_{t-1}$ lies (approximately) parallel to the vehicle's longitudinal axis $a_L$ when the vehicle 300 is travelling in an (approximately) straight line, in order to estimate the angular offset of the camera 302 relative to the vehicle 300. This is captured in the weighted average by assigning greater weight to intervals of more linear (straight line) motion.

Note that, strictly speaking, the vector difference $x_{t+1}-x_{t-1}$ lies approximately parallel to the vehicles longitudinal axis so long as the rate of turn is approximately constant (it doesn't actually require the vehicle to be travelling in a straight line). However the assumption of approximate constant rate of turn will be more likely to be true when the vehicle is more closely travelling in a straight line.

The calculation is performed as a vector average, in which the vector that represents the average forward motion of the car as expressed in the camera coordinate system. This vector when projected forwards will cut the image plane at a specific pixel (the forward point pixel). This pixel is the point which the car would seem to be moving towards if it were driving on a perfectly straight and flat road (the "forward point" as that term is used herein).

By way of example, the forward direction of the vehicle can be computed as a weighted average of the vector difference between the longitudinal axes of the camera and vehicle respectively according to the equation 1:

$$\frac{\sum_t w_{L,t}(x_{t+1}-x_{t-1})}{\sum_t w_{L,t}} \quad (1)$$

where $w_{L,t}=v_0 \cdot v_1$ as evaluated at time t.

The longitudinal vehicle axis $a_L$ at time t is assumed to lie parallel to the vector difference $x_{t+1}-x_{t-1}$.

Note that $x_{t+1}-x_{t-1}$ needs to be evaluated in the reference frame of the image capture device 302 in this context, in order to give meaningful results, i.e. in order for the weighted average of equation (1) to provide an accurate estimate of the direction of the vehicle's longitudinal axis $a_L$ relative to the camera's longitudinal axis $a_L'$.

The SLAM process will derive absolute values for $x_{t+1}$ and $x_{t-1}$, i.e. in the global coordinate system. However, the direction of the camera axes in the global coordinate system, i.e. the absolute orientation of the image capture device, at time t is also derived via the SLAM process itself, which can in turn be used to transform vectors in the global frame of reference into the frame of reference of the image capture device 302.

The dot product $v_0 \cdot v_1$ depends on the magnitude of the change in direction between t−1 and t+1, such that the smaller the change in the magnitude of direction, the greater weighting that is given to the measurement at time t.

As noted above, strictly speaking, the vector difference $x_{t+1}-x_{t-1}$ lies approximately parallel to the vehicles longitudinal axis so long as the rate of turn is approximately constant (it doesn't actually require the vehicle to be travelling in a straight line). Therefore an alternative weighting scheme could be used in which the vector difference at each time is weighted according to the change in curvature exhibited in the vehicle path between t−1 and t+1.

Of course, typically the orientation of the vehicle's axes remains fixed in the image capture device's frame of reference as the vehicle moves, because the camera 302 is expected to remain in an essentially fixed orientation relative to the vehicle 300—the time dependency in the above stems from the fact that the estimates of the vehicle and camera axes are not exact.

Time t corresponds to a certain point on the camera path CP, and can be a time at which one of the images was captured or a time in between captured images, to which a camera pose can be assigned by interpolation of the camera poses for different images.

In an alternative implementation the offset between $a_L$ and $a_L'$ could be represented as a pair of angles.

With reference to FIG. 10, once the angular orientation of the camera 302 relative to the vehicle 300 has been computed in this way, it is then possible to determine the orientation of the vehicle's longitudinal axis $a_L$ at any point along the camera path CP (including when the vehicle is not travelling in a straight line), based on the orientation of the camera's longitudinal axis $a_L'$ at that point, which is known from the SLAM computations.

5) The rotational orientation of the camera within the car—i.e. the rotational offset between the camera's vertical axis $a_V'$ and the vehicle's vertical axis $a_V$ (that is, the vehicle's vertical axis $a_V$ as measured within a frame of reference of the image capture device)—can be automatically deduced by noting that most roads are locally flat and so when the car is in a turn, the vector that is perpendicular to the surface described by the camera path will point directly downwards from the camera to the road surface. In more detail, again three equidistant points on the path are taken (though again it is not essential for these point to be equidistant), the cross product of the two vectors from the centre to the two outer points is taken and that is continuously averaged weighted by the magnitude of the cross product. Thus, times when the car is travelling in a curve are weighted more strongly than times when the car is travelling straight (at which point there is no information about the normal).

Figure 16:
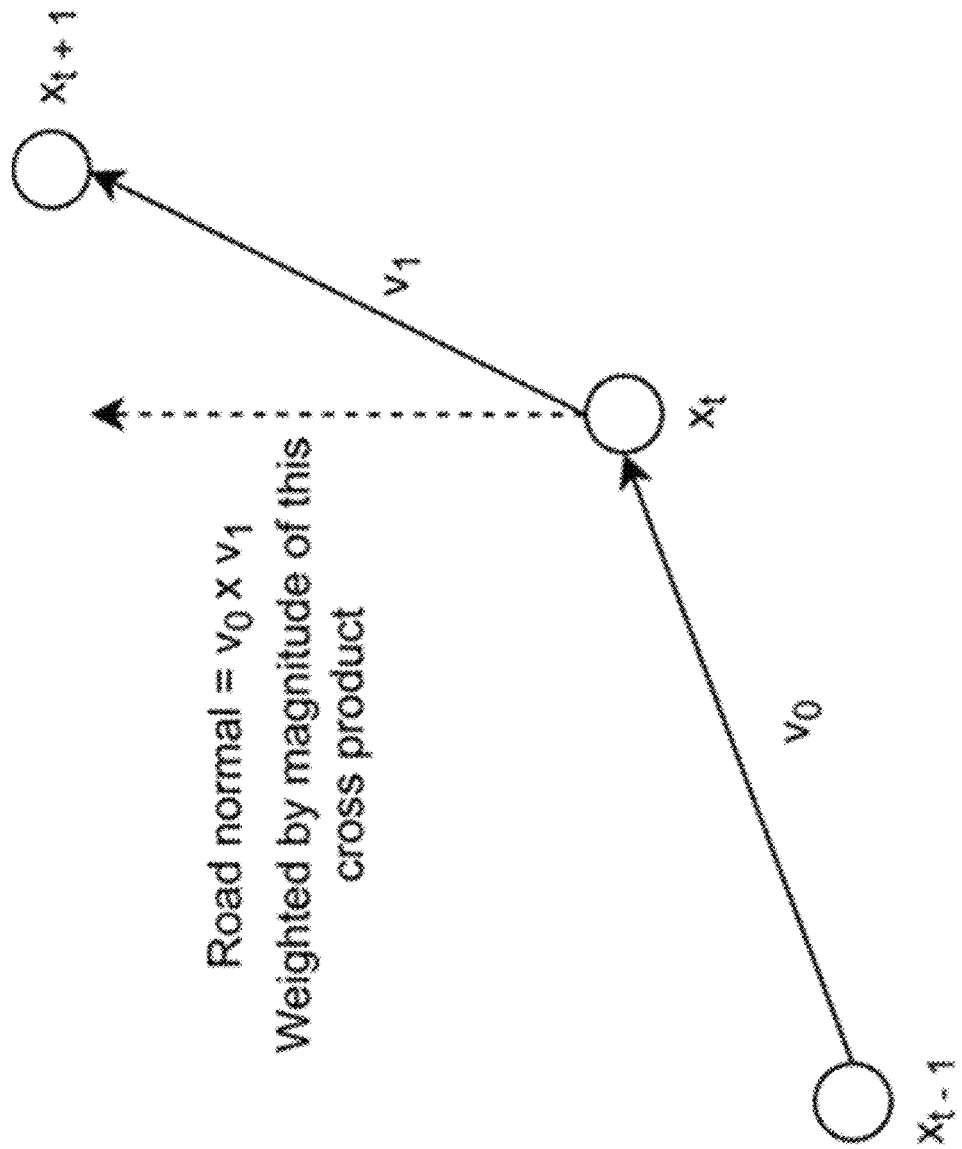
FIG. 16 illustrates certain principles of an image-based measurement of a road normal.

This is illustrated in FIG. 16.

In other words, this exploits the observation that, when the vehicle is exhibiting angular acceleration such that the vehicle path exhibits local curvature in 3D space, the plane in which the curved portion of the vehicle path lies is at least approximately parallel to the plane of the road surface under normal driving conditions; or, equivalently, the normal to the locally curved portion of the path is at least approximately parallel to the vertical axis $a_V$ of the vehicle 300.

The average normal vector of the path expressed in camera coordinates. The plane that is perpendicular to this road surface normal vector can be intercepted with the image plane and this will provide a line across the image that would match the horizon if the car were driving along a perfectly straight and level road (the "horizon line" as that term is used herein).

By way of example, the rotational orientation of the camera within the vehicle can be computed as a weighted average of the offset angle between the vertical axes of the camera and vehicle respectively according to the equation (2):

$$\frac{\sum_t w_{V,t} v_0 \times v_1}{\sum_t w_{V,t}} \quad (2)$$

where:
$w_{V,t} = |v_0 \times v_1|$ as evaluated at time t,
$v_0 = x_t - x_{t-1}$,
$v_1 = x_{t+1} - x_t$.

The vertical vehicle axis $a_V$ at time t is assumed to lie parallel to the vector cross product $v_0 \times v_1$.

As above, $v_0 \times v_1$ needs to be evaluated in the reference frame of the image capture device 302 in this context, in order to give meaningful results, i.e. in order for the weighted average of equation (s) to provide an accurate estimate of the direction of the vehicle's vertical axis $a_V$ relative to the camera's longitudinal axis $a_L'$. As noted above, the absolute orientation of the image capture device as determined via the SLAM process can be used to transform vectors from the global frame of reference into the frame of reference of the image capture device.

The magnitude of the cross-product $|v_0 \times v_1|$ increases as the constituent vectors move towards being perpendicular, as that is expected to yield the most accurate results. More generally they are weighted by a factor that increases as an offset angle α between those vectors tends towards ninety degrees, where $|v_0 \times v_1| = |v_0||v_1|\sin \alpha$.

As will be appreciated, many of the observations made above in relation to the angular orientation measurement also apply to the rotational orientation measurement.

6) The height of the camera above the road (H) can be calculated by generating a surface mesh of the road from the SLAM process (even though this is low accuracy) and then averaging the height of all points on the camera path above this mesh. The averaging across the whole path counteracts the poor accuracy of the mesh generated by the SLAM process.

The height H at a given point on the camera path CP is defined the distance between a point on the camera path CP and the mesh along the vehicle's vertical axis $a_V$ at that point. A reason the rotational orientation of the camera 302 within the vehicle 300 is needed is to determine where the vehicle's vertical axis lies at each point on the path so that the height estimation can be computed. This is illustrated in FIG. 11, in which the reconstructed surface map is labelled SM.

7) The left to right position of the camera (S) within the lane and also the width of the lane (W) can be estimated by using various computer vision techniques to detect the lane boundaries.

Detecting the lane edges is obviously a hard problem (and the whole purpose of generating this lane training data is to train a neural network to solve this problem). However, detecting lane edges in this specific case can be made into a significantly easier problem by virtue of having two additional pieces of information. Firstly, the known path of the camera (and thus shape of the lane) can be used to create a transform to effectively straighten out the road prior to doing any lane boundary detection. Secondly the positions at which to search for lane boundaries are significantly reduced because the centre line of the lane is (nearly) known from the camera path and lanes have widths that are relatively fixed.

For example, the images can be projected into a top down view, transformed to straighten out the road (using the camera path information) and then a Hough transform can be used to detect dominant lines with the correct approximate position and orientation.

The width of the road at each point on the camera path CP is defined as the distance between the detected lane boundaries along the transverse vehicle axis $a_T$ at that point. A reason the angular orientation of the camera 302 within the training vehicle 300 is needed in addition to the rotational orientation is to determine where the vehicle's transverse axis $a_T$ lies in order to estimate W and C at each point along the path. This is also illustrated in FIG. 11.

By exploiting all of the above, it is possible to fully automatically generate annotation of the lane driven by the car in all images of the video, using only images captured from a low-cost and un-calibrated image capture device.

It is also desirable to extend these techniques to label multiple lanes. One way to do this is as follows:

8) Multiple lanes (and thus the entire road surface) can be automatically annotated by driving along each lane and creating a single 3D SLAM reconstruction that includes the paths for each lane. It is necessary to merge the separate videos of driving along each line into a single reconstruction in order to obtain relative positioning of the lanes and the entire road surface.

Figure 17:
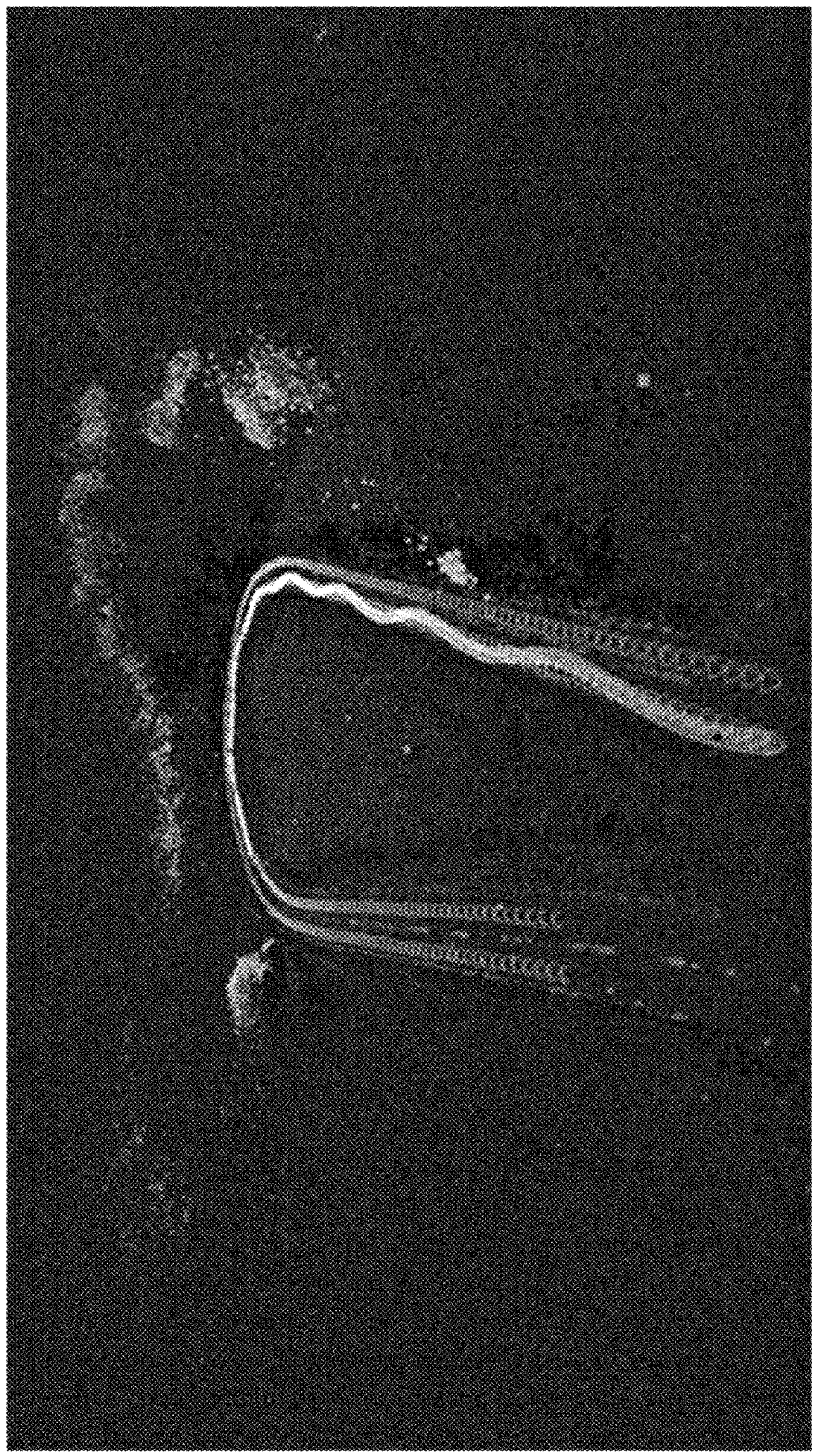
FIG. 17 shows an example image of a SLAM reconstruction of camera positions moving through a point cloud world.

FIG. 17 shows an image of a SLAM reconstruction of camera positions moving through a point cloud world, where there are two sets of camera images.

9) It is difficult to merge images from multiple videos into a single 3D reconstruction unless the camera images are all facing the same direction; i.e. it is not practical to merge videos of cars driving in opposite directions along the road into a single 3D reconstruction. One way to solve this is to drive in one direction with a forward-facing camera, and drive in the other direction (on the other lane) using a backwards-facing camera. This gives a single set of images all pointing in the same direction along the road.

Extension—Human Fixer Stage:

The fully automated annotation system described produces usable annotation, however it is still subject to a number of errors than can be fixed up with very little effort by a human annotator. For example:
the calculated camera height may not be exactly correct
the left/right position within the lane may not be exactly right the width of the lane may not be exactly right In addition to these fix ups for imperfect automatic calculations, there are some additional annotations that a human can add that are very low effort to add but provide significant benefit if they exist in the training data. For example:

Adjacent lanes can be added (without having to drive these lanes). They are easy to add because adjacent lanes generally have parallel boundaries to the lane that the car has driven.

Non-drivable parallel road features can be added. Regions of the road reserved for cycles or buses/taxis can be added simply (again they are generally just parallel regions of the ground that follow the driven lane).

Regions of pavement adjacent to the road can be added.

10) A tool with a simple user interface has been developed that allows a human annotator to make these 'fix ups' and also add these additional annotations. The major benefit of this tool is that the fix ups and additional annotations can be made in one frame of the video and the system can automatically propagate these changes through all the frames in the video.

This efficient saving stems from the fact that the user can adapt the 3D road model (via the model adaptation component 410) using one frame and its annotation data as a reference, and the fact that the adapted 3D road model can in turn can be applied to multiple images.

Note also, that the technology is not limited to manual adjustment of automatically generated road/lane models. Any object in the world that is stationary can be marked and that object's position in each image of the video can be calculated (since the motion of the camera is known).

In this way one frame of video with already pre-populated nearly correct annotations can be provided to a human and with minimal fix up they can generate circa 50-100 well annotated images. It would be possible to generate even more images if longer fragments of video were used, but in our experience, the length of video that it is convenient to 3D reconstruct and is also reasonably similar in its construction is sufficient to contain 50-100 images.

11) Note that the images that are used as training data are sampled from the whole video such that they are spaced a reasonable distance apart in space (not time) to provide some diversity of training data for the networks. There is little benefit in taking every image from the video as most of them are very similar to each other.

Figure 6:
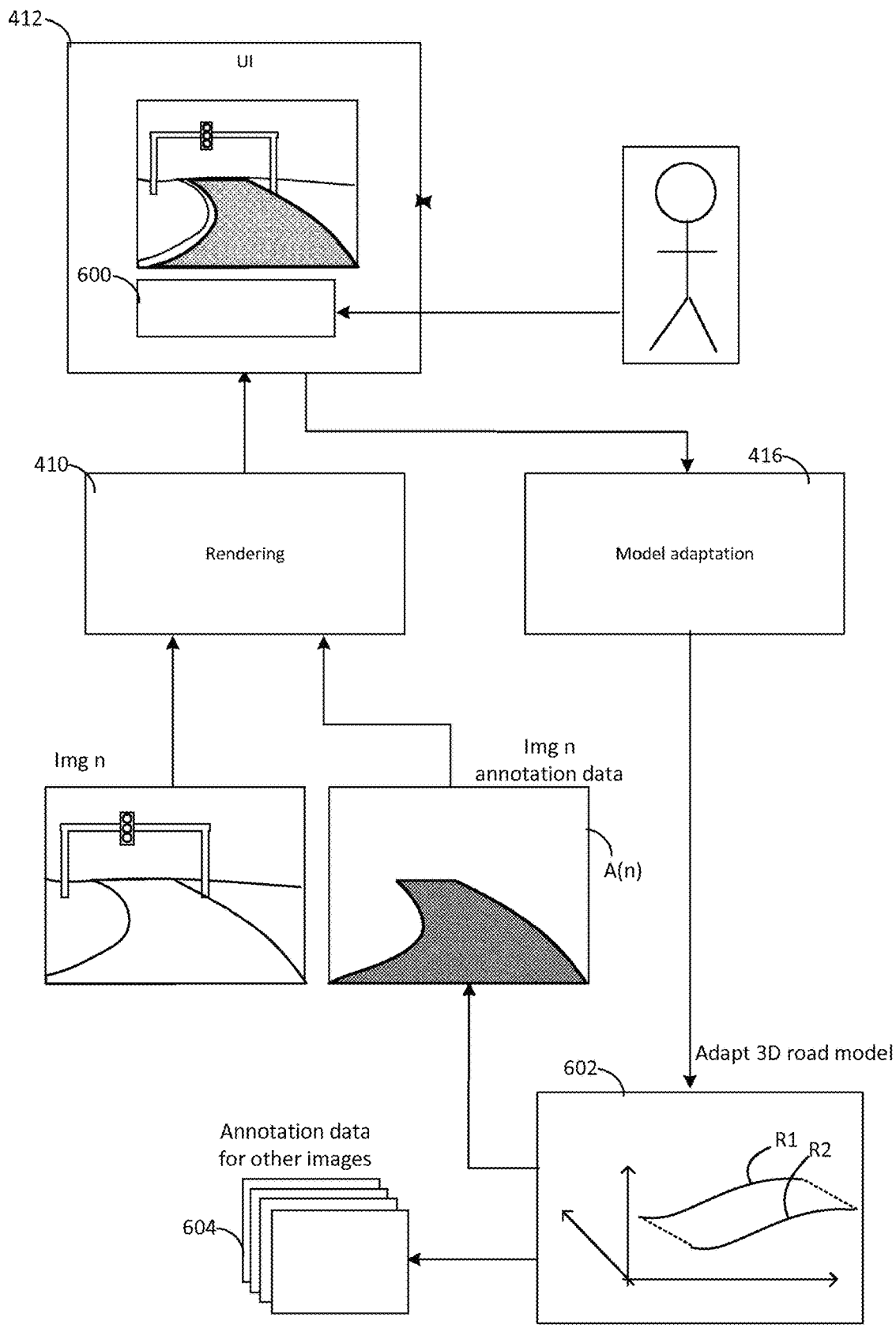
FIG. 6 shows a schematic block diagram denoting image system functionality to facilitate adjustment at a human fixer stage.

FIG. 6 shows a schematic block diagram that illustrates an example of the types of adjustment that can be performed at the human fixer stage. The rendering component can render data of any one of the captured images on a display of the user interface 412, overlaid with its associated annotation data A(n). One or more selectable options 600 are also rendered, which a user can select in order to cause the model adaptation component 410 to adapt the 3D road model 602, in a fast and intuitive manner. As indicated in FIG. 6, as the road model 602 is updated, not only is the annotation data A(n) that is currently being rendered modified in accordance with the adapted model 602, but the adapted model 602 can also be used to update the annotation data 604 for other images in the same video sequence. By way of example, the top part of FIG. 6 shows a marked road or lane within an image. Although the right-hand side boundary R2 accurately coincides with a real-world right-side boundary visible in the image, the left-side boundary R1 is slightly off. The user can fix this quickly by shifting the position of the left-side boundary in the 3D model, using the current image and the annotation data rendered on the current image as a reference to manually adapt the location of the left-side boundary R2 until it corresponds with a real-world left-side boundary visible in the image. This change will apply across multiple images in the sequence, meaning that the left-side road boundary will be accurately placed in those images for as long as the road/lane remains the same width.

The fact that much of the road structure of interest lies parallel to the vehicle path is exploited to provide a range of extremely quick manual annotation options:

The width or location of the automatically-determined road structure can easily be changed ("nudging");

Additional road structure that lies parallel to the vehicle path/automatically determined road can easily be created, and its width and location can be easily nudged in the same way. The additional road structure is oriented parallel to the vehicle path/existing road structure automatically. For example, the automatically determined road structure may be an "ego lane", i.e. the lane along with the vehicle drives. Additional structure can very easily be added across multiple images such as:

other lanes, e.g. non-ego lanes, bus lanes, cycle lanes, central or left/right road markings, or any other parallel road markings, non-drivable areas such as pavements, grass, barriers, roadside growth (trees, hedges etc.)

Perpendicular road structure, i.e. extending perpendicular to the automatically determined road structure/vehicle path, can also be added very easily, and its width and location can be nudged in the same way. Examples include junctions, give-way lines or other perpendicular road marking's etc., or other structure at an assumed angle from the path (e.g. branching points in the road).

Changes in the width of the road, e.g. due to the number of lanes changing, can be accommodated by allowing the user to "split" the video sequence at a point of his/her choosing. After a split point the video, the user's adaptations will only be applied to the 3D road model at points after the split points—the parts of the model preceding the split point will remain unchanged, which in turn means the annotation data for the images before the split point remains unchanged.

By way of example, the following workflow is considered. The user starts at the beginning of a training sequence. The 3D ego-lane has been automatically determined using the techniques above. Moreover, the locations of the centre and left/right lane markers have been determined, by assuming these are of a certain width and lie at the centre and far right/far left of the ego lane. At tis point the user can adapt the ego lane width and position, and also the width and position of the road markings if necessary, to align them with the actual ego lane/road markings visible in the image. The user can also add additional parallel structure at this point, such as non-ego lanes, non-driveable areas etc.

An example of an automatically annotated image, pre-fix up is shown in FIG. 18, in which only the ego lane (and its assumed centre line and lane boundaries) are marked. As can be seen, the markings do not exactly line with the actual lane boundaries. FIG. 19 shown the image after a fix up, where the width and position of the ego-lane has been adjusted, and the other lanes and non-drivable regions have been marked.

These changes are applied to the underlying 3D model, hence will also be applied to the subsequent images in the sequence. The user can then cycle through the following images, quickly verifying that everything still matches up.

When the user gets to a point in the video at which a junction is clearly visible in one of the images s/he can add a junction structure at that point, and nudge its location/ width as needed. Again, this is applied to the 3D model, therefore will apply to all of the images in which the junction is visible. Non-drivable road structure at the edges of the road will be automatically adapted to accommodate the parallel junction (i.e. any part of the non-drivable road structure that overlaps with the new junction will be removed automatically).

Figure 22:
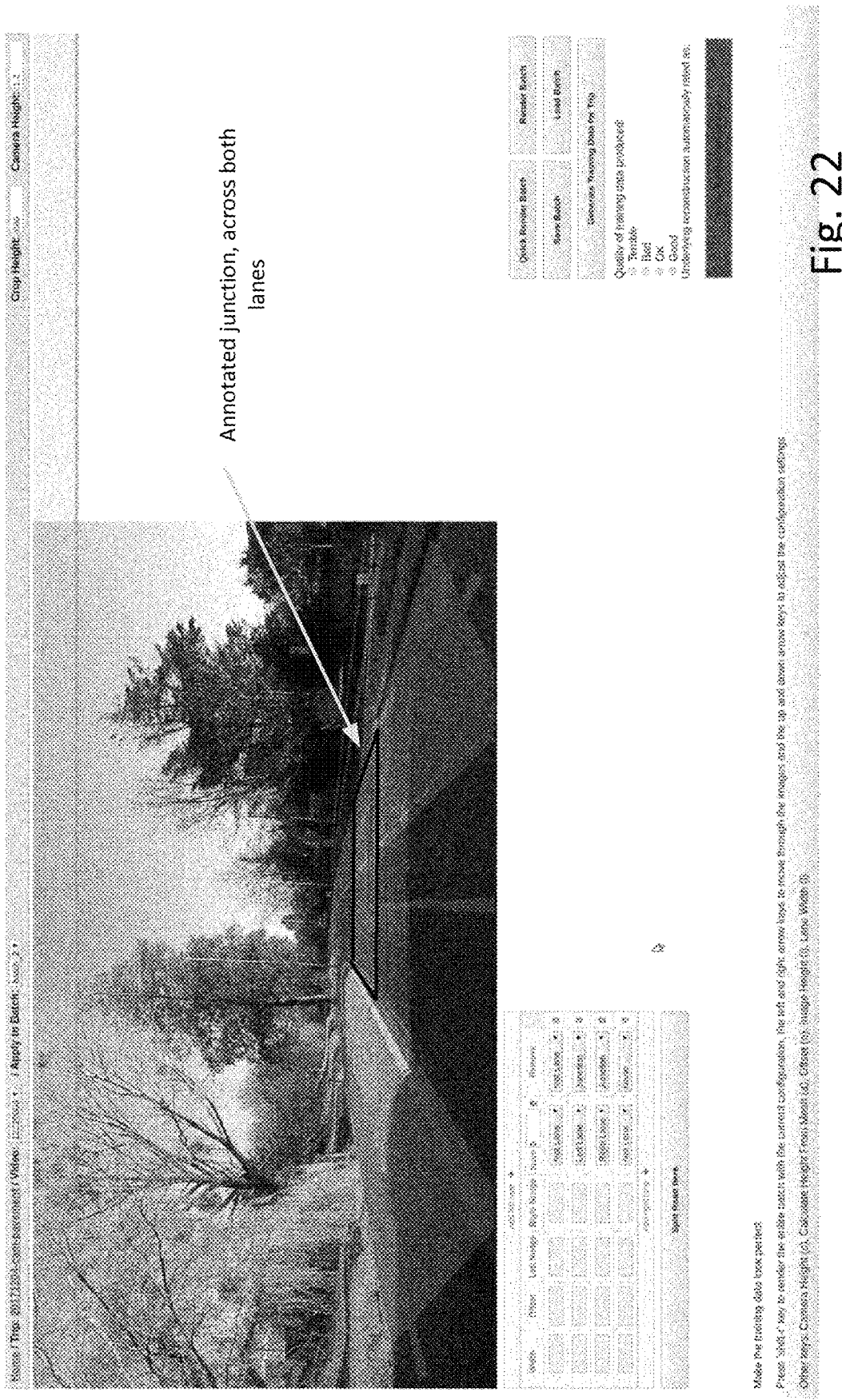

An example of the UI when a junction has just been added is shown in FIG. 22. The user has defined the junction as cutting through the left and right lanes, perpendicular to the lanes.

Figure 12:
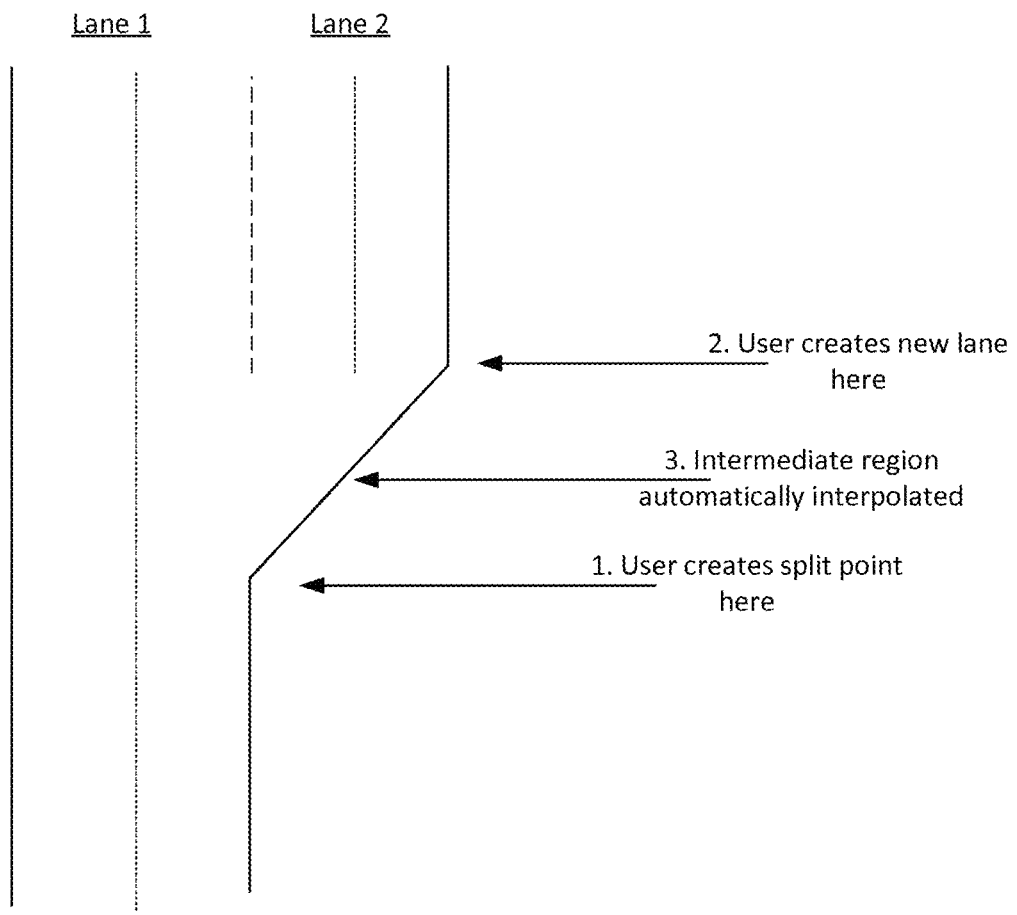
FIG. 12 shows an example of a manual adjustment at a human fixer stage.

With reference to FIG. 12, when the user gets to a point in the video at which the road/lane width changes (e.g. lane narrows/widens, the number of lanes changes or is reduced etc.), s/he can split the video at that point and modify the underlying model using that frame as a reference (step 1, FIG. 12). The location of the current video frame is mapped to a point on the vehicle path, which in turn is used to restrict adaptations of the 3D model to the part of the model after that point only—points before that (where the user has already verified that the annotations match the images) are unaffected. At this point, the user can change the road width, add a lane etc. The system is capable of automatically interpolating parallel structure around split points, e.g. linearly interpolating. For example, when adding a lane, typically the road will gradually widen until it is able to accommodate the new lane, the user can go forward into the video to the point at which the new lane reaches its full width, and add the lane at that point (step 2, FIG. 12). The system automatically interpolates between the intermediate region, in which the width of the new lane is assumed to increase linearly until reaching its final width (for example)—step 3, FIG. 12.

Figure 23:
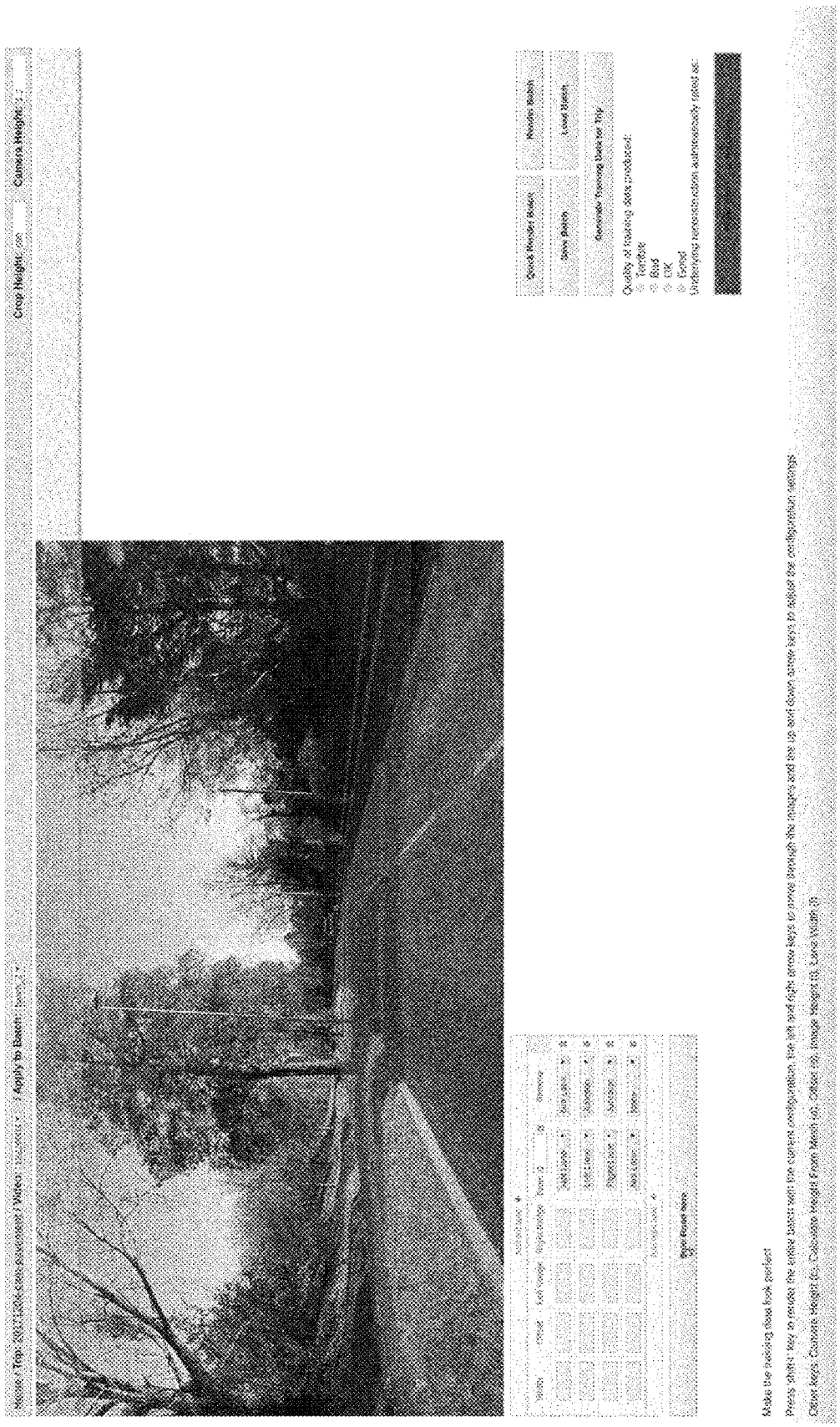
Figure 24:
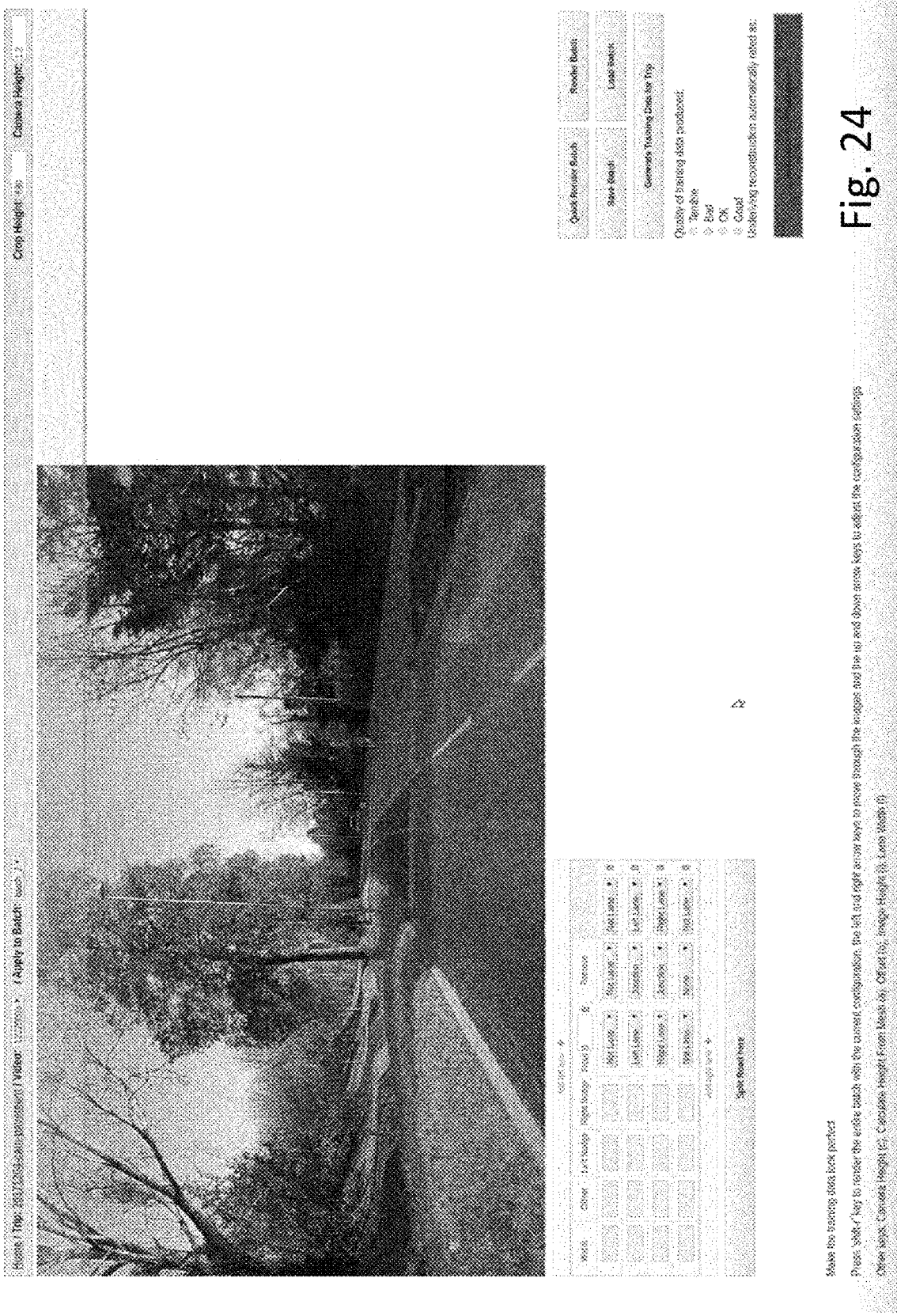

FIGS. 23 and 24 show an example of this. In FIG. 23, the user has selected the option to split the video shortly after the junction of FIG. 22, to accommodate the fact that there is now a wider non-drivable region of road on the right hand side, which the user has annotated accordingly in FIG. 24.

As an extension, the user can also mark an area of sky in the images. This can be a simple case of the user defining a sky line, above which all of the images are definitely sky. Even though this will not label all of the sky in the images, this can still be useful in preventing the trained neural network from identifying sky as road structure. More sophisticated techniques could use the 3D road structure to infer a sky line in each image, e.g. based on the highest point of the road in 3D space.

Extensions Beyond Lane Training Data:

Any feature in the video that is parallel to the path followed can benefit from the same speed up in annotation and single click addition by the human annotator.

12) For example, the road markings can be annotated in this way. Both in position and type. Including centre dashed or solid lines, road edge lines, double yellow lines etc. For example, cycle lanes can be added in this way, as can pavements.

Figure 20:
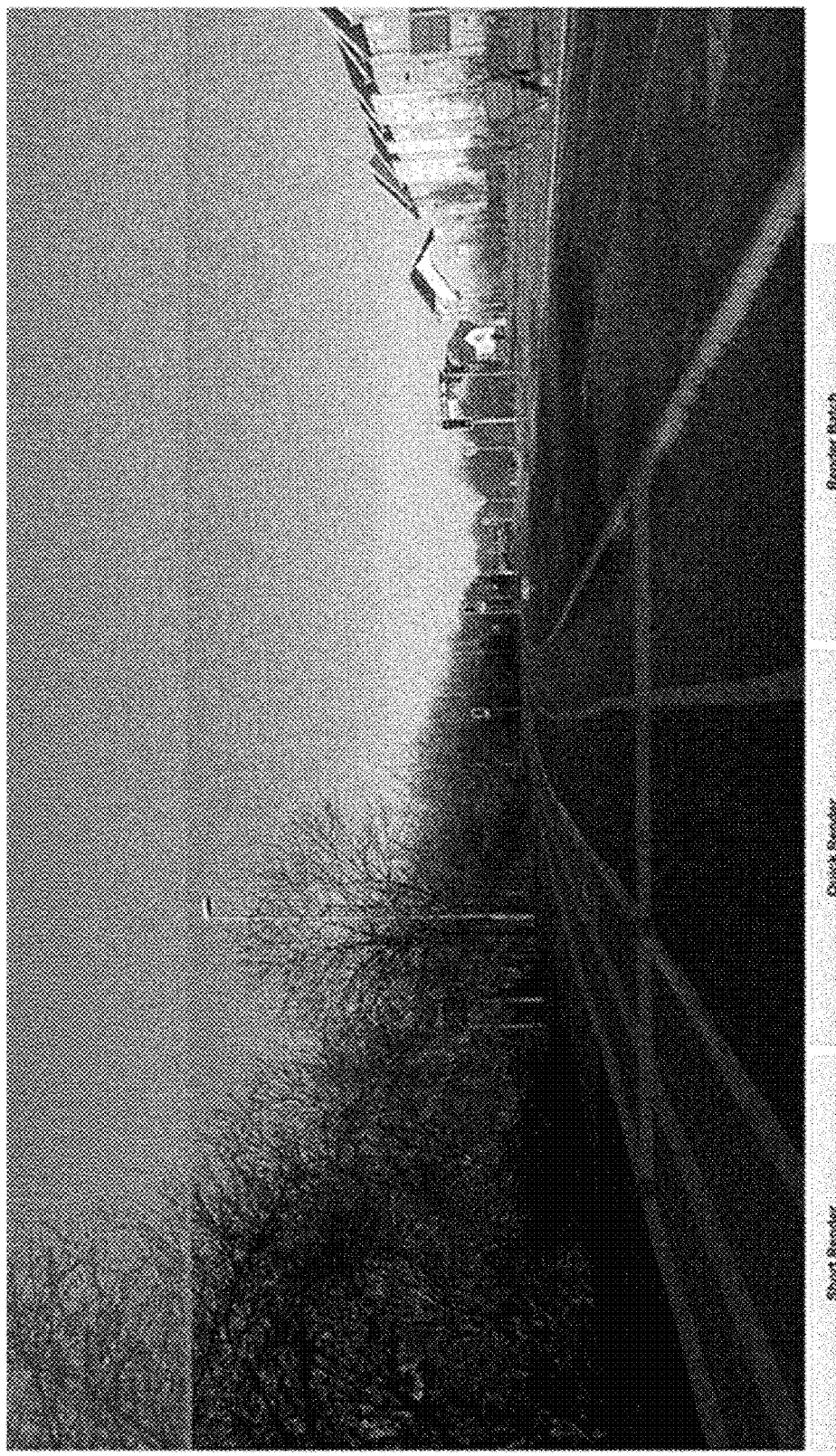

FIG. 20 shows an example of an image in which a cycle lane is marked, to the left-hand side.

Any feature in the video stationary in the world can benefit from some level of speed up. Even if they cannot directly be created as a result of their shape being parallel to the path driven, they can still benefit from the fact that they can be marked up by a human in one frame of the video and automatically propagated through to all frames of the video.

13) For example, road signs can be annotated in this way. The sign can be specifically marked out by a human in one frame (with or without any initial hint provided by a poor-quality detection) and then automatically propagated though the entire set of images in the video.

Annotation for stationary vehicles can be generated in this same way. Although the technique does not automatically allow annotation of moving objects to be sped up in the same way, the technique can be used for parked vehicles. Thus, allowing a subset of vehicles in the scene to be annotated with minimal effort. Moving vehicles could be annotated by marking the same object in multiple (at least two) images and assuming constant speed in-between the annotations. Then the label can be propagated to all images in-between the annotated ones.

14) Note that vehicles that are stationary look just the same as vehicles that are moving, so a neural network trained on annotated images of stationary vehicles, can be used at run time to detect moving vehicles.

FIG. 21 shown an image in which a 3D bounding box of a vehicle is being added.

Another benefit of this technique is that the human can choose to annotate an object in an image in the video when the camera is close to it (i.e. when the object is large). This accurate annotation is then propagated to all images even when the object is small within the image.

15) Since there is a 3D model underlying the whole sequence of images in the video, then annotations automatically generated when the object is more distant from the camera will have the accuracy of annotation when the object was large and annotated by a human. This can often be more accurate than could be achieved by a human trying to annotate the small image of the object.

Use Case Examples:

The trained road detection component 102 has a number of useful applications within an autonomous vehicle 200.

The ability of the trained road detection component 102 to identify road structure within captured images based on machine vision can be used in combination with predetermined road map data. Predetermined road map data refers to data or a road map or maps that have been created in advance, of the kind currently used in GPS-based navigation units (such as smartphones or "satnavs") and the like.

One such application is localization, where road structure identified by the trained road detection component 102 can be used to more accurately pinpoint the vehicle's location on a road map. This works by matching the road structure identified via machine vision with corresponding road structure of the predetermined map. The location of the autonomous vehicle 200 relative to the identified road structure can be determined in three-dimensions using a pair of stereoscopically arranged image capture devices, for example, which in turn can be used to determine the location of the autonomous vehicle on the road map relative to the corresponding road structure on the map.

Another such application merges the visually-identified road structure with corresponding road structure of the road map. For example, the road map could be used to resolve uncertainty about visual road structure detected in the images (e.g. distant or somewhat obscured visual structure). By merging the roadmap with the uncertain visual structure, the confidence of the structure detection can be increased.

Experiments and Statistics

Table 1 provides a comparison of the method of this disclosure with prior art benchmarks, identified in the References section below.

TABLE 1

Comparison of the available datasets. Label time per image is only shown if provided by the authors.

| Name | Year | #labeled frames | #videos | img. seq. | road area | ego lane | lane instances | label time per img. |
|---|---|---|---|---|---|---|---|---|
| Caltech Lanes [18] | 2008 | 1,224 | 4 | ✓ | ✓[b] | — | ✓ | — |
| CamVid [14, 5] | 2008 | 701 | 4 | ✓ | ✓ | — | — | 20 min |
| Yotta [15] | 2012 | 86 | 1 | ✓ | ✓ | — | — | — |
| Daimler USD [16] | 2013 | 500 | — | — | ✓[c] | — | — | — |
| KITTI-Road [17] | 2013 | 600 | — | — | ✓ | ✓ | — | — |
| Cityscapes [6] (fine) | 2016 | 5,000 | — | ✓[a] | ✓ | — | — | 90 min |
| Cityscapes [6] (coarse) | 2016 | 20,000 | — | ✓[a] | ✓ | — | — | 7 min |
| Mapillary Vistas [7] | 2017 | 20,000 | — | — | ✓ | — | — | 94 min |
| TuSimple [19] | 2017 | 3,626 | 3,626 | ✓[a] | ✓[b] | ✓ | ✓[d] | — |
| Our Lanes | 2018 | 23,980 | 402 | ✓ | ✓ | ✓ | ✓ | 5 sec |

[a] Only single images are annotated, but additional (non-annotated) image sequences are provided.
[b] Road area is implicitly annotated by the given lanes.
[c] Annotated ground instead of road, i.e. it includes non-drivable area.
[d] Limited to three instances: ego-lane and left/right of ego-lane.

4 Dataset Statistics and Split

The method has been tested on a data set ("present dataset") which includes 402 sequences, 23,979 images in total, and thus on average 60 images per sequence. Table 2(a) shows a breakdown of the included annotation types. In total, there were 47,497 lane instances annotated, i.e. 118.2 per sequence. Instance IDs are consistent across a sequence, i.e. consecutive frames will use the same instance ID for the same lane. Furthermore, the annotators were instructed to categorise each sequence according the scene type: urban, highway or rural. The breakdown of the sequences is shown in Table 2(b).

TABLE 2

Dataset breakdown according scene type (a) and annotation coverage (b). Coverage of scene types and instances is measured as percentage of the total number of sequences, while the coverage of annotations is measured as percentage of the total number of pixels.

(a)

| Scene type | |
|---|---|
| Urban | 58.61% |
| Highway | 10.56% |
| Rural | 30.83% |

(b)

| Annotation type | |
|---|---|
| annotation density | 77.53% |
| non-road | 62.13% |
| road | 15.40% |
| ego-lane | 8.84% |
| mean/median/min/max | |
| #instances (per sequence) | 2.2/2.1/6 |

The data was split into two sets, for training and testing. The train set comprises 360 sequences and a total of 21,355 frames, while the test set includes 42 sequences and 2,624 frames. The test set was selected to include the same urban/motorway/rural distribution as the train set. The frames of the training set are made available with both images and annotations while only the images are provided for the testing set.

Furthermore, the average annotation time per scene type has been measured, and it has been found that there is a large variation, with an urban scene taking roughly three times longer than a highway or countryside scene of similar length (see Table 3). This is due to the varying complexity in terms of the road layout, which is caused by various factors: the frequency of junctions and side roads, overall complexity of lane structure and additional features such as traffic islands and cycle lanes that are typically not found outside of an urban setting.

The annotation quality is measured through agreement between the two annotators on twelve randomly selected sequences. 84.3% of the pixels have been given a label by at least 1 annotator, with 67.3% of these being given an annotation by both annotators; i.e. 56.8% of all pixels were given an annotation by both annotators. The agreement on these overlapping labels is measured via Intersection-over-Union (IoU). The results are shown in Table 4. The standard deviation is calculated over the 12 sequences.

TABLE 3

Measured average annotation time in seconds.

| Scene type | Urban | Highway | Rural |
|---|---|---|---|
| Per sequence | 361 | 100 | 140 |
| Per image | 5 | 2 | 2 |

TABLE 4

Agreement of the annotators measured by IoU.

| Task | IoU | std |
|---|---|---|
| Road vs non-road | 97.2 ± 1.5 | |
| Ego-Lane vs road vs non-road | 94.3 ± 3.4 | |
| | AP@50 | AP |
| Lane instance segmentation | 99.0 | 84.4 |

5 Experiments

To demonstrate the results achievable using the present annotation method, evaluation procedures, models and results are provided for two example tasks: Semantic Segmentation and Instance Segmentation.

5.1 Road and Ego-Lane Segmentation

The labels and data described in 3.2 directly allow for two segmentation tasks: Road/Non-Road detection and Ego/Non-Ego/Non-Road lane detection. The well-studied Seg- Net [29] model was used as a baseline, trained separately for both the Ego and Road experiments.

When training on the present dataset's training data, all available training data was randomly split by sequence into a training and validation set, randomly selecting 10% of the available training batches as a validation set. During training, each input image was reprocessed by resizing it to have a height of 330 px and extracting a random crop of 320×320 px; the crops were selected randomly each time an image was selected to be involved in a minibatch. To train the SegNet models, ADAM was used with a learning rate of 0.001 which is decayed to 0.0005 after 25000 steps and then to 0.0001 after 50000 steps. The training was performed for 100,000 training steps, reporting results on the model which converges on the validation set. A mini batch size of two was used and the optimisation was performed on a per pixel cross entropy loss.

For evaluation, a number of SegNet models were trained following the above configuration. Models were trained on the training set, CityScapes coarse, Mapillary and KITTI Lanes. A Road/Non-Road model was trained for all datasets, but Ego/Non-Ego/Non-Road was trained for the UM portion of KITTI Lanes and the present dataset.

For each model the IoU and the FI score are provided. Each model is measured on held out data from every dataset. For CityScapes and Mapillary the held out set is the pre-defined validation set of both datasets, for the present dataset the held out set is the corresponding test set. The exception to this scheme is KITTI Lanes which has no available annotated held out set and reducing KITTFs size further by holding out a validation set would reduce the size of an already small dataset making results more difficult to interpret. Therefore, the entire KITTI training set is targeted by models Mapillary and CityScapes. IoU and FI are measured for each class for each task and an average across classes for each task is provided. These results can be seen in Tables 5 and 6.

Before analysing these results it should be noted that these evaluations are not directly comparable to the intended evaluation of CityScapes, Mapillary or KITTI Lanes due to the present treatment of Lane and Road underneath cars on the road.

Also to achieve the results reported below on a model trained on the present dataset alone, the car hood and ornament had to be cropped out of the CityScapes validation set. All the numbers reported against the CityScapes validation set have had this processing applied. Without this processing Mapillary's IoU on CityScapes drops by 2% and the present IoU falls to 56%.

This notwithstanding, a clear trend can be observed between the datasets. Firstly, it should be noted that the highest IOUs achieved in the experimental setup came from models trained on the same data they were being evaluated against. This points to an overall generalisation issue in vision datasets, no dataset performs as well on out of dataset data as compared to within dataset data.

The rest of the analysis concerns the results achieved by models trained on data outside the target evaluation dataset (i.e. the off diagonals in the results tables). The least populous dataset KITTI Lanes2 achieves the worst IoU across all tasks. Cityscapes is the next largest dataset3 and achieves the next highest IoU across most tasks and finally Mapillary, the dataset most similar in size to the present dataset, achieves the next highest IoU while still performing significantly worse than the present methods own across all tasks.

5.2 Lane Instance Segmentation

The annotation of multiple distinct lanes per image, the number of which is variable across images and potentially sequences, naturally suggests an instance segmentation task against the present dataset. Though it has been postulated that "Stuff" is uncountable and therefore doesn't have instances, this lane instance segmentation task os presented as a counter example. Indeed it would seem many stuff-like classes (parking spaces, lanes in a swimming pool, fields in satellite imagery) can have meaningful delineations and therefore instances applied.

Providing a useful baseline for this lane instance segmentation task presents its own challenges. The current state of the art for instance segmentation on Cityscapes is MaskRCNN [32]. This approach is based on the RCNN object detector and is therefore optimised for the detection of compact objects which fit inside broadly non overlapping bounding boxes, traditionally called "Things". In the case of lanes detected in the perspective view, a bounding box for any given lane greatly overlaps neighbouring lanes, making the task potentially challenging for standard bounding boxes. This becomes more apparent when the road undergoes even a slight curve in which case the bounding boxes are almost on top of on another even though the instance pixels are quite disjoint. Recently, a few works have explored an alternative approach to RCNN based algorithms which use pixel embeddings to perform instance segmentation [33-36]; a baseline for the present dataset is provided using pixel embeddings.

Specifically, a model was trained based on [33], adopting their approach of learning per pixel embeddings whose value is optimised such that pixels within the same training instance are given similar embeddings, while the mean embedding of separate instances are simultaneously pushed apart. A cost function which learns such pixel embeddings can be written down exactly and is presented in Equations 1-4 of [33]. For comparison, the same hyper parameters reported in that work were used. This loss was imposed as an extra output of a Road/Non-Road SegNet model trained alongside the segmentation task from scratch.

At run time a variant of the approach proposed by [33] was followed, predicting an embedding per pixel. The prediction of Road was used to filter away pixels which are not likely to be lanes. Pixels were then uniformly sampled in the road area and their embeddings were clustered using the Mean Shift [37] algorithm, identifying the centres of the detected lane instances. Finally, all pixels in the road area are assigned to a single lane instance using the Euclidean distance.

To evaluate the lane instances the AP measures were used calculated as per the MS-COCO instance segmentation task. Specifically: calculate the average precision across images and across IoU thresholds of detected lanes (pixels assigned to embedding cluster centroids) and ground truth lanes. A detection is a true positive when it overlaps a ground truth instance with an IoU above some threshold. A ground truth is a false negative when it has no lanes assigned to it in this way and a detection is a false positive when it does not sufficiently overlap any ground truth instance. Using these definitions, an average precision at 50% IoU and an average AP across multiple thresholds from 50% to 95% in increments of 5% was obtained as set out in Table 7. The present approach does not provide a score for any given lane instance detection instead lane detections are ordered by their size, choosing to assign larger lane instances to ground truths before smaller ones.

TABLE 5

Results for the Road/Non-Road task, measured by IoU and F1 score.
The training/test setup of each number is described in the table.

|  |  | Trained On | | | |
|---|---|---|---|---|---|
|  |  | Ours | Mapillary | CityScapes | KITTI |
|  |  | IoU | | | |
| Tested On | Our Test Set | 0.950 | 0.854 | 0.732 | 0.710 |
|  | Mapillary Val | 0.829 | 0.900 | 0.796 | 0.696 |
|  | CityScapes Val | 0.852 | 0.852 | 0.900 | 0.604 |
|  | KITTI Lanes Train | 0.838 | 0.726 | 0.746 | — |
|  | Average Without Self | 0.840 | 0.811 | 0.758 | 0.670 |
|  |  | F1 | | | |
| Tested On | Our Test Set | 0.974 | 0.919 | 0.837 | 0.816 |
|  | Mapillary Val | 0.904 | 0.947 | 0.883 | 0.810 |
|  | CityScapes Val | 0.919 | 0.919 | 0.947 | 0.740 |
|  | KITTI Lanes Train | 0.909 | 0.835 | 0.848 | — |
|  | Average Without Self | 0.911 | 0.891 | 0.856 | 0.758 |

TABLE 6

Results for the Ego/Non-Ego/Non-Road task, measured
by IoU and F1 score. The training/test setup
of each number is described in the table.

|  |  | Trained On | |
|---|---|---|---|
|  |  | Ours | KITTI |
|  |  | IoU | |
| Test | Our Test Set | 0.885 | 0.392 |
|  | KITTI Train | 0.612 | — |
|  |  | F1 | |
| Test | Our Test Set | 0.937 | 0.483 |
|  | KITTI Train | 0.726 | — |

TABLE 7

Results for lane instance segmentation

| Metric | Score |
|---|---|
| AP | 0.250 |
| AP@50 | 0.507 |

The initial presented experiments show promising generalisation results across datasets.

Extensions of the disclosed techniques include the following:

(1) Annotations of many other object classes of the static road layout are not included, like buildings, traffic signs and traffic lights.

(2) All annotated lanes are parallel to the future driven path, thus currently lane splits and perpendicular lanes (e.g. at junctions) have been excluded.

(3) Positions of dynamic objects, like vehicles, pedestrians and cyclists, may be included. In future work, those limitations could be addressed by adding further annotations of different objects in 3D.

Non-parallel lanes could be handled by extending the annotator tool to allow for variable angles for the lanes in the road plane. Furthermore, the position of dynamic objects could be estimated by including additional modalities, like stereo vision or lidar.

REFERENCES

5. Brostow, G. J., Fauqueur, J., Cipolla, R.: Semantic object classes in video: A high-definition ground truth database. Pattern Recognition Letters 30(2) (2009) 88-97
6. Cordts, M., Omran, M., Ramos, S., Rehfeld, T., Enzweiler, M., Benenson, R., Pranke, U., Roth, S., Schiele, B.: The cityscapes dataset for semantic urban scene understanding. CVPR (2016)
7. Neuhold, G., Ollmann, T., Bulo, S. R., Kontschieder, P.: The mapillary vistas dataset for semantic understanding of street scenes. In: Proceedings of the Inter-inational Conference on Computer Vision (ICCV), Venice, Italy. (2017) 22-29
14. Brostow, G. J., Shotton, J., Fauqueur, J., Cipolla, R.: Segmentation and recognition using structure from motion point clouds. In: European conference on computer vision, Springer (2008) 44-57
15. Sengupta, S., Sturgess, P., Torr, P. H. S., Others: Automatic dense visual semantic mapping from street-level imagery. In: Intelligent Robots and Systems (IROS), 2012 IEEE/RSJ International Conference on, IEEE (2012) 857-862
16. Scharwachter, T., Enzweiler, M., Franke, U., Roth, S.: Efficient multi-cue scene segmentation. In: German Conference on Pattern Recognition, Springer (2013)
17. Fritsch, J., Kuehnl, T., Geiger, A.: A new performance measure and evaluation benchmark for road detection algorithms. In: 16th International IEEE Conference on Intelligent Transportation Systems (ITSC 2013), IEEE (2013) 1693-1700
18. Aly, M.: Real time detection of lane markers in urban streets. In: IEEE Intelligent 675 676 Vehicles Symposium, Proceedings, IEEE (2008) 7-12
19. TuSimple: Lane Detection Challenge (Dataset). http://benchmark.tusimple.ai (2017)
27. Barnes, D., Maddern, W., Posner, I.: Find Your Own Way: Weakly-Supervised Segmentation of Path Proposals for Urban Autonomy. ICRA (2017)
28. Mapillary: OpenSfM (Software). https://github.com/mapillary/OpenSfM (2014)
29. Badrinarayanan, V., Kendall, A., Cipolla, R.: Segnet: A deep convolu-f)" tional encoder-decoder architecture for image segmentation. arXiv preprint arXiv:1511.00561 (2015)

32. He, K., Gkioxari, G., Dollar P., Girshick, R. B.: Mask R-CNN. CoRR abs/1703.06870 (2017)
33. Brabandere, B. D., Neven, D., Gool, L. V.: Semantic instance segmentation with a aki discriminative loss function. CoRR abs/1708.02551 (2017)
34. Li, S., Seybold, B., Vorobyov, A., Fathi, A., Huang, Q., Kuo, C. C. J.: Instance embedding transfer to unsupervised video object segmentation (2018)
35. Fathi, A., Wojna, Z., Rathod, V., Wang, P., Song, H. O., Guadarrama, S., Murphy, K. P.: Semantic instance segmentation via deep metric learning. CoRR 713 abs/1703.10277 (2017)
36. Kong, S., Fowlkes, O: Recurrent pixel embedding for instance grouping (2017)
37. Comaniciu, D., Meer, P.: Mean shift: A robust approach toward feature space analysis. IEEE Trans. Pattern Anal. Mach. Intell. 24(5) (May 2002) 603-619.

ANNEX A

| Algorithm 1 Automated ego-lane estimation |
| --- |
| 1: Measure height of the camera about road h |
| 2: Apply OpenSFM to get $c_i$, $R_i$ |
| 3: Estimate road normal a according Eq. (3) |
| 4: Estimate forward direction f according Eq. (5) |
| 5: Derive vector across road r according Eq. (4) |
| 6: set $w_i^{left} = \frac{1}{2}w$ and $w_i^{right} = -\frac{1}{2}w$, where w is the default lane width |
| 7: Derive border points $b_i^{left}$, $b_i^{right}$ according Eq. (1) |
| 8: for each frame i do |
| 9: Get all future border points $\hat{b}_j^{left}$, $\hat{b}_j^{right}$, j > i according Eq. (2) |
| 10: Draw polygons with edges $\hat{b}_j^{left}$, $\hat{b}_j^{right}$, $\hat{b}_{j+1}^{right}$, $\hat{b}_{j+1}^{left}$ |

The invention claimed is:

1. A method of annotating road scene images, the method comprising implementing, at an image processing system, the following steps:
receiving a time sequence of two dimensional images as captured by an image capture device of a travelling vehicle;
processing the images to reconstruct, in three-dimensional space, a path travelled by the vehicle;
using the reconstructed vehicle path to determine expected road structure extending along the reconstructed vehicle path; and
generating road annotation data for marking at least one of the images with an expected road structure location, by performing a geometric projection of the expected road structure in three-dimensional space onto a two-dimensional plane of that image.

2. A method according to claim 1, wherein the step of using the reconstructed vehicle path to determine the expected road structure comprises determining an expected road structure boundary, defined as a curve in three-dimensional space running parallel to the reconstructed vehicle path, wherein the road annotation data is for marking the location of the expected road structure boundary in the image.

3. A method according to claim 1, wherein the expected road structure location in that image is determined from at least one of the path travelled by the vehicle after that image was captured and/or the path travelled by the vehicle before that image was captured.

4. A method according to claim 1, wherein the annotated road images are for use in training an automatic road detection component for an autonomous vehicle.

5. The method of claim 1, wherein the expected road structure is determined based on at least one of: a road or lane width, and an offset of the vehicle from a road or lane boundary.

6. The method according to claim 5, wherein a constant road or lane width or offset is applied across at least part of the time series of images.

7. The method of claim 5, wherein the road or lane width is determined based on one or more manual width adjustment inputs, wherein the manual width adjustment inputs are received in respect of one image and used to modify the expected road structure and project the modified road structure into one or more other of the images.

8. The method of claim 1, wherein the expected road structure is determined based on a road normal vector n, estimated from the images as:

$$n = \frac{1}{\sum_{i=2}^{N-2} \|n_i\|} \sum_{i=2}^{N-2} n_i$$

$$n_i = R_i^{-1}(m_{i-1,i} \otimes m_{i,i+1}),$$

Ri being a camera pose determined for image i in reconstructing the vehicle path, and $m_{i,j}$ being a normalised motion vector between frames i and j.

9. The method of claim 1, wherein the expected road structure is determined based on a forward direction vector, estimated from the images as:

$$f = \frac{1}{\sum_i a_i} \sum_{i=2}^{N-2} a_i f_i$$

$$a_i = \max(m_{i-1,i}^T m_{i,i+1}, 0)$$

$$f_i = R_i^{-1} m_{i-1,i+1}.$$

Ri being a camera pose determined for image i in reconstructing the vehicle path, and $m_{i,j}$ being a normalised motion vector between frames i and j.

10. The method of claim 9, wherein the expected road structure is determined based on a road normal vector n, estimated from the images as:

$$n = \frac{1}{\sum_{i=2}^{N-2} \|n_i\|} \sum_{i=2}^{N-2} n_i$$

$$n_i = R_i^{-1}(m_{i-1,i} \otimes m_{i,i+1}),$$

wherein f and n are used to determined border points of the expected road structure as:

$$b_i^{left} = g_i + w_i^{left} R_i r$$

$$b_i^{right} = g_i + w_i^{right} R_i r$$

$$r = f \otimes n,$$

$g_i$ being a road point below the image capture device and $w_i^{left}, w_i^{right}$ being distances to left and right borders of a road lane in which the vehicle is travelling respectively.

11. The method of claim 10, wherein the road point below the image capture device is computed as:

$$g_i = c_i + hR_i n$$

wherein h is a height of the image capture device and $c_i$ is a 3D position of the image capture device determined in reconstructing the vehicle path.

12. The method of claim 1, wherein the vehicle path is reconstructed using simultaneous localization and mapping (SLAM) processing.

13. The method of claim 12, wherein at least one of a camera pose $R_i$ and/or a 3D camera location $c_i$ is determined for each image i in performing the SLAM processing.

14. The method of claim 1, wherein the projection is performed based on a height of the image capture device in the vehicle, wherein the height is estimated based on an average height of a reconstructed path of the image capture device and a 3D road structure mesh computed from the images.

15. A computer program product comprising code stored on a computer-readable storage medium and configured, when executed on one or more processors, to implement operations comprising:
receiving a time sequence of two dimensional images as captured by an image capture device of a travelling vehicle;
processing the images to reconstruct, in three-dimensional space, a path travelled by the vehicle;
using the reconstructed vehicle path to determine expected road structure extending along the reconstructed vehicle path; and
generating road annotation data for marking at least one of the images with an expected road structure location, by performing a geometric projection of the expected road structure in three-dimensional space onto a two-dimensional plane of that image.

16. The computer program product of claim 15, wherein, in performing said processing of the images, an absolute angular orientation of the image capture device is estimated for at least one reference point on the reconstructed path, said operations comprising:
determining a forward direction vector defined as a vector separation between a point before the reference point on the reconstructed path and a point after the reference point on the reconstructed path; and
using the forward direction vector and the absolute angular orientation of the image capture device determined for the reference point to determine an estimated angular orientation of the image capture device relative to the vehicle, the estimated angular orientation used to determine the expected road structure.

17. The computer program product of claim 16, wherein an absolute angular orientation is determined for the image capture device for multiple reference points on the reconstructed path in the processing step and the determining and using steps are performed for each of the reference points to determine an estimated angular orientation of the image capture device relative to the vehicle for each of the reference points, and wherein said operations further comprise:
determining a weighted average of the relative image capture device angular orientations, each of the relative image capture device angular orientations being weighted in dependence on a change in direction exhibited in the path between the earlier reference point and later reference point.

18. The computer program product of claim 15, wherein, in performing said processing of the images, an absolute rotational orientation of the image capture device is estimated for at least one reference point on the reconstructed path, said operations comprising:
determining a first separation vector between the reference point and a point before the reference point on the reconstructed path;
determining a second separation vector between the reference point and a point after the reference point on the reconstructed path; and
using the first and second separation vectors and the absolute rotational orientation of the image capture device determined for the reference point to determine an estimated rotational orientation of the image capture device relative to the vehicle, the estimated rotational orientation used to determine the expected road structure.

19. The computer program product of claim 18, said operations comprising:
determining a normal vector for the reference point, perpendicular to the first and second separation vectors, wherein the normal vector and the absolute rotational orientation are used to determine the estimated rotational orientation of the image capture device relative to the vehicle.

20. An image processing system comprising:
an input configured to receive a time sequence of two dimensional images as captured by an image capture device of a travelling vehicle; and
one or more processors configured to implement operations comprising:
processing the images to reconstruct, in three-dimensional space, a path travelled by the vehicle;
using the reconstructed vehicle path to determine expected road structure extending along the reconstructed vehicle path; and
generating road annotation data for marking at least one of the images with an expected road structure location, by performing a geometric projection of the expected road structure in three-dimensional space onto a two-dimensional plane of that image.

* * * * *